United States Patent
Gottin et al.

(10) Patent No.: US 11,093,404 B2
(45) Date of Patent: Aug. 17, 2021

(54) EFFICIENT PRE-FETCHING ON A STORAGE SYSTEM

(71) Applicant: EMC IP Holding Company LLC, Hopkinton, MA (US)

(72) Inventors: Vinicius Gottin, Rio de Janeiro (BR); Jonas F. Dias, Rio de Janeiro (BR); Hugo de Oliveira Barbalho, Rio de Janeiro (BR); Romulo D. Pinho, Niterói (BR); Tiago Calmon, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/601,422

(22) Filed: Oct. 14, 2019

(65) Prior Publication Data
US 2021/0109860 A1    Apr. 15, 2021

(51) Int. Cl.
*G06F 12/0871* (2016.01)
*G06F 12/0882* (2016.01)
*G06F 12/0862* (2016.01)

(52) U.S. Cl.
CPC ...... *G06F 12/0871* (2013.01); *G06F 12/0862* (2013.01); *G06F 12/0882* (2013.01)

(58) Field of Classification Search
CPC .......... G06F 12/0862; G06F 12/0871; G06F 12/0882
See application file for complete search history.

(56) References Cited

U.S. PATENT DOCUMENTS

| 9,529,722 | B1* | 12/2016 | Tang | G06F 12/0862 |
| 2004/0205298 | A1* | 10/2004 | Bearden | G06F 12/0862 711/137 |
| 2009/0177842 | A1* | 7/2009 | Kulkarni | G06F 12/0862 711/125 |
| 2014/0052927 | A1* | 2/2014 | McCauley | G06F 12/0862 711/137 |
| 2014/0223116 | A1* | 8/2014 | Jeddeloh | G06F 13/1626 711/158 |
| 2016/0291868 | A1* | 10/2016 | Halaharivi | G06F 3/0659 |
| 2017/0185512 | A1* | 6/2017 | Small | G06F 12/0246 |

OTHER PUBLICATIONS

U.S. Appl. No. 16/508,347, filed Jul. 11, 2019, Gottin, et al.
U.S. Appl. No. 16/601,446, filed Oct. 14, 2019, Gottin, et al.

* cited by examiner

*Primary Examiner* — Eric T Oberly
(74) *Attorney, Agent, or Firm* — Muirhead and Saturnelli, LLC

(57) ABSTRACT

Managing a cache memory in a storage system includes maintaining a first queue that stores data indictive of the read requests for a particular logical storage unit of the storage system in an order that the read requests are received by the storage system and maintaining a second queue that stores data indictive of the read requests for the particular logical storage unit in a sort order corresponding to page numbers of the read requests, the second queue persisting for a plurality of iterations of read requests. A read request is received and data indicative of the read request is placed in the first queue and in the second queue while maintaining the sort order of the second queue. The second queue is used to determine a prefetch metric that varies according to a number of adjacent elements in the second queue.

20 Claims, 16 Drawing Sheets

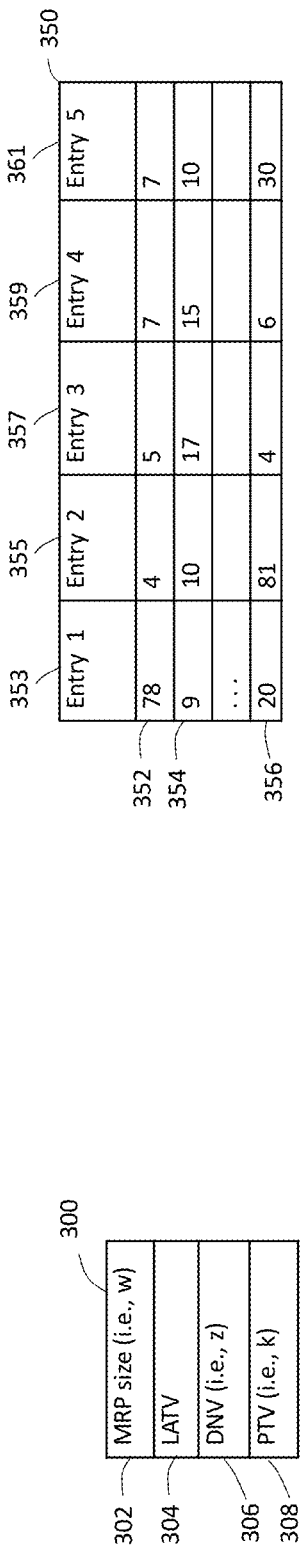
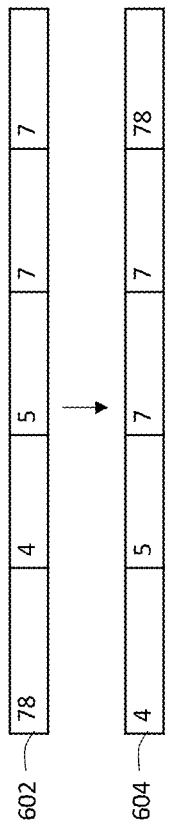
FIG. 3B
FIG. 3A
FIG. 6

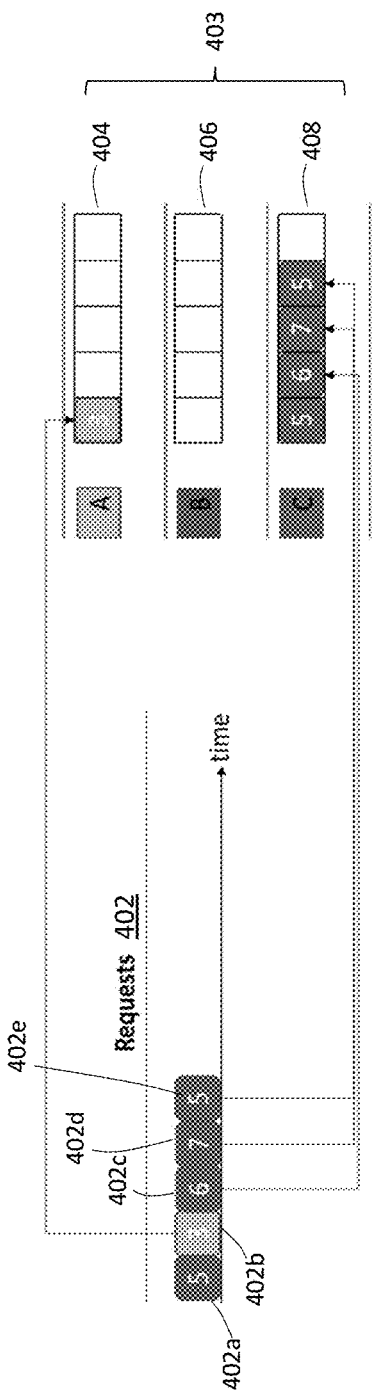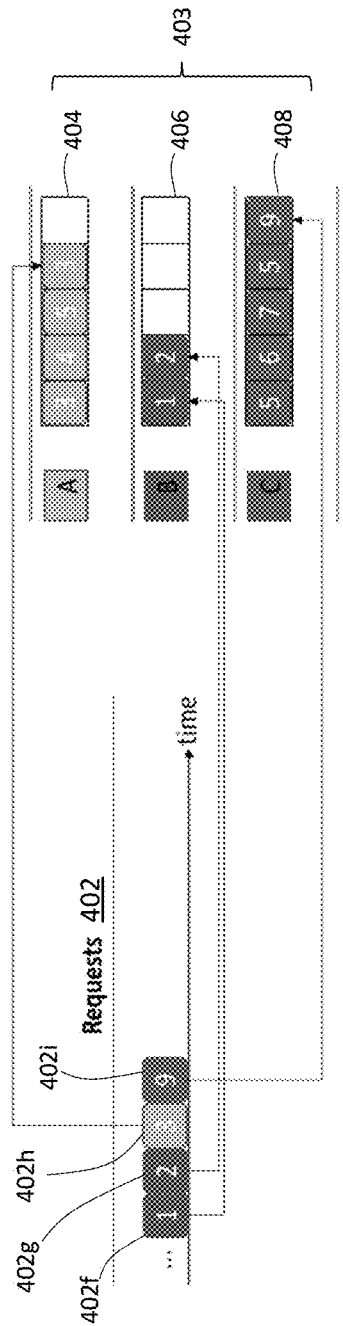

EFFICIENT PRE-FETCHING ON A STORAGE SYSTEM

TECHNICAL FIELD

This application relates to data storage systems and more particularly to pre-fetching data on data storage system.

BACKGROUND OF THE INVENTION

Host processor systems (hosts) may store and retrieve data using a storage system containing a plurality of host interface units (I/O modules), physical storage units (e.g., disk drives, solid state drives), and disk interface units (disk adapters). The host systems access the storage system through a plurality of channels provided therewith. Host systems provide data and access control information through the channels to the storage system and the storage system provides data to the host systems also through the channels. The host systems do not address the physical storage units of the storage system directly, but rather, access what appears to the host systems as a plurality of logical volumes. The logical volumes may or may not correspond to the physical storage units. Allowing multiple host systems to access the single storage system allows the host systems to share data stored therein. Multiple storage systems and host systems may be interconnected by network components, for example, as part of a switching fabric, to form a data storage network. Storage systems may provide any of a variety of data services to host systems of the storage network.

A storage system may have global memory that is shared by components of the storage system. The global memory may include a cache to temporarily store data that is otherwise stored on physical storage devices of the storage system. Components of the storage system access data in cache faster (often much faster) than data stored on a physical storage device. Data written to the storage system from a host is first stored in the cache, and then de-staged to one or more target physical storage devices after some time. Similarly, data read from the storage system is loaded in to the cache because there is a high likelihood that the same data will be accessed again in the near future. After some period of time, a portion of data stored in the cache is evicted in accordance with an eviction policy such as a least recently used (LRU) policy.

In some cases, data may be prefetched into the cache for read operations in anticipation of the data being requested by a host. That is, data is read into the cache prior to being accessed by a host because it is anticipated that the host will access the data in the near future. Pre-fetching is a well-known technique to optimize cache behavior that exploits data locality with the assumption that applications often request data residing in sequential addresses in a given address space. When a storage system receives a data access request at a certain address, Ai, the storage system retrieves not only the content of that location, but also the content of the next N address locations, {Ai+1, . . . , Ai+N}, in anticipation of the application requesting the data from the N next address locations in the near future. The storage system places the retrieved content in the cache, which, by design, is a much faster media than the media where the data originally resides (e.g., a disk). If the application indeed requests data from subsequent addresses, the storage system satisfies the requests directly from the cache instead of fetching data from the slower media for each request. The parameter N defines a number of sequential addresses that the storage system pre-fetches to the cache at each request, and it is referred to as a look-ahead window or look-ahead value, LAV.

An approach for the implementation of pre-fetching in cache policies is to set a fixed look-ahead window for all logical storage units (e.g., LUNs) in the system. Using a fixed look-ahead window has an advantage of requiring no additional computation during execution. However, a static look-ahead window may cause a significant number of unnecessary pages being brought to the cache in order to ensure a higher hit ratio. The hit ratio is a number of times requested data is already in the cache divided by a total number of times data is requested. Loading unnecessary pages into the cache create a cache pollution problem where pages are pre-fetched but are not used. Unnecessary pages fetched into the cache leads to premature eviction of other pages that would otherwise have been accessed while in cache, thus reducing the hit ratio. Note that reducing the look-ahead window to minimize cache pollution may reduce the hit ratio. In an extreme case, with a static look-ahead of zero pages, the system reverts to an LRU policy with no pre-fetching.

It is desirable to provide a pre-fetch mechanism that maximizes cache hits of data that is pre-fetched while minimizing cache pollution.

SUMMARY OF THE INVENTION

According to the system described herein, managing a cache memory in a storage system includes maintaining a first queue that stores data indictive of the read requests for a particular logical storage unit of the storage system in an order that the read requests are received by the storage system, maintaining a second queue that stores data indictive of the read requests for the particular logical storage unit in a sort order corresponding to page numbers of the read requests, the second queue persisting for a plurality of iterations of read requests, receiving a read request for a particular page of the particular logical storage unit, placing data indicative of the read request in the first queue, placing the data indicative of the read request in the second queue while maintaining the sort order of the second queue, using the second queue to determine a prefetch metric that varies according to a number of adjacent elements in the second queue having a difference that is less than a predetermined value and greater than zero, and prefetching a plurality of pages that come after the particular page sequentially in response to the prefetch metric being greater than a pre-defined value. The first queue and the second queue may have a fixed size. The pre-defined value may be based on a look-ahead window. The pre-fetch metric may be determined by dividing the number of adjacent elements in the second queue having a difference that is less than a predetermined value and greater than zero by a number of adjacent elements in the second queue having a difference that is greater than zero. A number of elements may be discarded from the first queue and the second queue in response to the read request occurring when the queues are full. The number of elements that are discarded may be 50% of the elements. There may be a relationship between elements of the first queue and elements of the second queue that facilitates accessing corresponding elements of the second queue by initially accessing elements of the first queue.

According further to the system described herein, a non-transitory computer readable medium contains software that manages a cache memory in a storage system that also contains a first queue that stores data indictive of the read requests for a particular logical storage unit of the storage system in an order that the read requests are received by the storage system and a second queue that stores data indictive of the read requests for the particular logical storage unit in a sort order corresponding to page numbers of the read requests, the second queue persisting for a plurality of iterations of read requests. The software including executable code that receives a read request for a particular page of the particular logical storage unit, executable code that places data indicative of the read request in the first queue, executable code that places the data indicative of the read request in the second queue while maintaining the sort order of the second queue, executable code that uses the second queue to determine a prefetch metric that varies according to a number of adjacent elements in the second queue having a difference that is less than a predetermined value and greater than zero, and executable code that prefetches a plurality of pages that come after the particular page sequentially in response to the prefetch metric being greater than a predefined value. The first queue and the second queue may have a fixed size. The pre-defined value may be based on a look-ahead window. The pre-fetch metric may be determined by dividing the number of adjacent elements in the second queue having a difference that is less than a predetermined value and greater than zero by a number of adjacent elements in the second queue having a difference that is greater than zero. A number of elements may be discarded from the first queue and the second queue in response to the read request occurring when the queues are full. The number of elements that are discarded may be 50% of the elements. There may be a relationship between elements of the first queue and elements of the second queue that facilitates accessing corresponding elements of the second queue by initially accessing elements of the first queue.

According further to the system described herein, a storage system includes a plurality of storage units that store data written to the storage system, a first subset of directors coupled to the storage units, a second subset of directors that provide data access to the storage system, including data access to write data to the storage system and data access to read data that was previously written to the storage system, a memory coupled to at least some of the directors, the memory providing a cache memory, and providing a first queue that stores data indictive of read requests for a particular logical storage unit of the storage system in an order that the read requests are received by the storage system and a second queue that stores data indictive of the read requests for the particular logical storage unit in a sort order corresponding to page numbers of the read requests, the second queue persisting for a plurality of iterations of read requests and includes a non-transitory computer readable medium containing software that manages the cache memory, the software having executable code that receives a read request for a particular page of the particular logical storage unit, executable code that places data indicative of the read request in the first queue, executable code that places the data indicative of the read request in the second queue while maintaining the sort order of the second queue, executable code that uses the second queue to determine a prefetch metric that varies according to a number of adjacent elements in the second queue having a difference that is less than a predetermined value and greater than zero, and executable code that prefetches a plurality of pages that come after the particular page sequentially in response to the prefetch metric being greater than a predefined value. The first queue and the second queue may have a fixed size. The pre-defined value may be based on a look-ahead window. The pre-fetch metric may be determined by dividing the number of adjacent elements in the second queue having a difference that is less than a predetermined value and greater than zero by a number of adjacent elements in the second queue having a difference that is greater than zero. A number of elements may be discarded from the first queue and the second queue in response to the read request occurring when the queues are full. There may be a relationship between elements of the first queue and elements of the second queue that facilitates accessing corresponding elements of the second queue by initially accessing elements of the first queue.

According further to the system described herein, managing a cache memory in a storage system includes maintaining a queue that stores data indictive of the read requests for a particular logical storage unit of the storage system in an order that the read requests are received by the storage system, receiving a read request for a particular page of the particular logical storage unit, removing a number of elements in the queue and resizing the queue in response to the queue being full, placing data indicative of the read request in the queue, determining a prefetch metric that varies according to a number of adjacent elements in a sorted version of the queue having a difference that is less than a predetermined value and greater than zero, and prefetching a plurality of pages that come after the particular page sequentially in response to the prefetch metric being greater than a predefined value. The queue may be resized based on an expected lifetime of pages in the cache memory. The expected lifetime may be estimated based on whether elements being removed from the queue correspond to pages that are still in the cache memory. The queue may be resized by an amount corresponding to an amount that the expected lifetime is adjusted from a previous iteration. The number of elements that may be removed is 50% of the elements. The pre-defined value may be based on a look-ahead window. The pre-fetch metric may be determined by dividing the number of adjacent elements in the sorted version of the queue having a difference that is less than a predetermined value and greater than zero by a number of adjacent elements on the sorted version of the queue having a difference that is greater than zero.

According further to the system described herein, a non-transitory computer readable medium contains software that manages a cache memory in a storage system that also contains a queue that stores data indictive of the read requests for a particular logical storage unit of the storage system in an order that the read requests are received by the storage system. The software includes executable code that receives a read request for a particular page of the particular logical storage unit, executable code that removes a number of elements in the queue and resizes the queue in response to the queue being full, executable code that places data indicative of the read request in the queue, executable code that determines a prefetch metric that varies according to a number of adjacent elements in a sorted version of the queue having a difference that is less than a predetermined value and greater than zero, and executable code that prefetches a plurality of pages that come after the particular page sequentially in response to the prefetch metric being greater than a predefined value. The queue may be resized based on an expected lifetime of pages in the cache memory. The expected lifetime may be estimated based on whether elements being removed from the queue correspond to pages that are still in the cache memory. The queue may be resized by an amount corresponding to an amount that the expected lifetime is adjusted from a previous iteration. The number of elements that may be removed is 50% of the elements. The pre-defined value may be based on a look-ahead window. The pre-fetch metric may be determined by dividing the number of adjacent elements in the sorted version of the queue having a difference that is less than a predetermined value and greater than zero by a number of adjacent elements on the sorted version of the queue having a difference that is greater than zero.

According further to the system described herein, a storage system includes a plurality of storage units that store data written to the storage system, a first subset of directors coupled to the storage units, a second subset of directors that provide data access to the storage system, including data access to write data to the storage system and data access to read data that was previously written to the storage system, a memory coupled to at least some of the directors, the memory providing a cache memory, and providing a queue that stores data indictive of read requests for a particular logical storage unit of the storage system in an order that the read requests are received by the storage system, and a non-transitory computer readable medium containing software that manages the cache memory. The software has executable code that receives a read request for a particular page of the particular logical storage unit, executable code that removes a number of elements in the queue and resizes the queue in response to the queue being full, executable code that places data indicative of the read request in the queue, executable code that uses a sorted version of the queue to determine a prefetch metric that varies according to a number of adjacent elements in the sorted version of the queue having a difference that is less than a predetermined value and greater than zero, and executable code that prefetches a plurality of pages that come after the particular page sequentially in response to the prefetch metric being greater than a predefined value. The queue may be resized based on an expected lifetime of pages in the cache memory. The expected lifetime may be estimated based on whether elements being removed from the queue correspond to pages that are still in the cache memory. The queue may be resized by an amount corresponding to an amount that the expected lifetime is adjusted from a previous iteration. The number of elements that may be removed is 50% of the elements. The pre-defined value may be based on a look-ahead window. The pre-fetch metric may be determined by dividing the number of adjacent elements in the sorted version of the queue having a difference that is less than a predetermined value and greater than zero by a number of adjacent elements on the sorted version of the queue having a difference that is greater than zero.

In some embodiments, for a data storage system including a cache and one or more physical storage devices, where data for a plurality of logical storage units is stored on the one or more physical storage devices, a method is performed. The method includes receiving a first read request to read a first page of a first of the plurality of logical storage units, and, for a first group of one or more most recent read requests for the first logical storage unit, the first group including the first read request and one or more most recent read requests for the logical storage unit prior to the first read request, for a plurality of the one or more most recent read requests specifying a respective second page of the first logical storage unit, determining a value of a proximity metric indicative of a collective sequential proximity of the first page and the one or more second pages within the first logical storage unit. The method further includes determining whether to pre-fetch one or more next sequential pages to the first page of the first logical storage unit based on the value of the proximity metric, fetching the first page from the one or more physical storage device into the cache, and prefetching the one or more next sequential pages from the one or more physical storage devices into the cache only if it is determined to prefetch the one or more next sequential pages.

Determining whether to pre-fetch the one or more next sequential pages of the first logical storage unit may include comparing the proximity metric to a predefined proximity threshold and determining to pre-fetch the one or more next sequential pages if the proximity metric is greater than or equal to the predefined proximity threshold.

A predefined look-ahead value may define a number of next pages to pre-fetch for the first logical storage unit for a pre-fetch operation. Determining the proximity metric may include sorting the first group into a first sequence according to a sequential order of the first page and the one or more second pages with the first logical storage unit, and, for each pair of successive read requests in the first sequence, determining a page difference, if any, between the respective pages of the pair, and, if there is a page difference between the respective pages, adding one to a page difference count, determining whether an amount of the page difference is the same or less than the look-ahead value, and if the amount of the page difference is the same or less than the look-ahead value, adding one to a pre-fetch hit count. Determining the proximity metric value may further include calculating the proximity metric value as the pre-fetch hit count divided by the page difference count.

A predefined look-ahead value may define a number of next pages to pre-fetch for the first logical storage unit for a pre-fetch operation, the proximity metric may be based at least in part on the look-ahead value, and the method may further include modifying a probability of performing a pre-fetch operation by changing the look-ahead value.

The method may further include maintaining a data structure including one or more entries, each entry corresponding to a respective one of the plurality of logical storage units, and each entry specifying a group of most recent read requests for the respective logical storage unit corresponding to the entry, where determining the proximity metric may include accessing the data structure.

Each entry of the data structure may include one or more page fields specifying a respective value for a page of one of the one or more most recent read requests of the logical storage unit represented by the entry, up to a predefined maximum number of page field values. The method may further include, in response to receiving the first read request, determining that a first entry of the one or more entries of the data structure already includes the predefined maximum number of page field values, removing one or more oldest page field values from the first entry, and adding a page field value representing the first page.

The determination of whether to pre-fetch the one or more next sequential pages may not include determining whether any data of the first logical storage unit is currently stored in the cache.

In some embodiments, a data storage system includes a cache, a plurality of logical storage units, one or more physical storage devices on which data for the logical storage units is stored, one or more processors; and a memory including code stored thereon that, when executed, performs the above-described method.

In some embodiments, one or more computer-readable media, for example, non-transitory computer-readable media, are provided having software stored thereon, the software including executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 3A is a block diagram illustrating a data structure for storing cache pre-fetch parameter values, according to embodiments of the system described herein.

FIG. 3B is a block diagram illustrating a data structure for recording most recently requested pages for logical storage units, according to embodiments of the system described herein.

FIGS. 4A-4F illustrates populating a data structure for recording most recently requested pages for logical storage units in response to receiving read requests, according to embodiments of the system described herein.

FIG. 6 illustrates sorting recent page requests for a logical storage unit, according to embodiments of the system described herein.

DETAILED DESCRIPTION OF EMBODIMENTS

Figure 1:
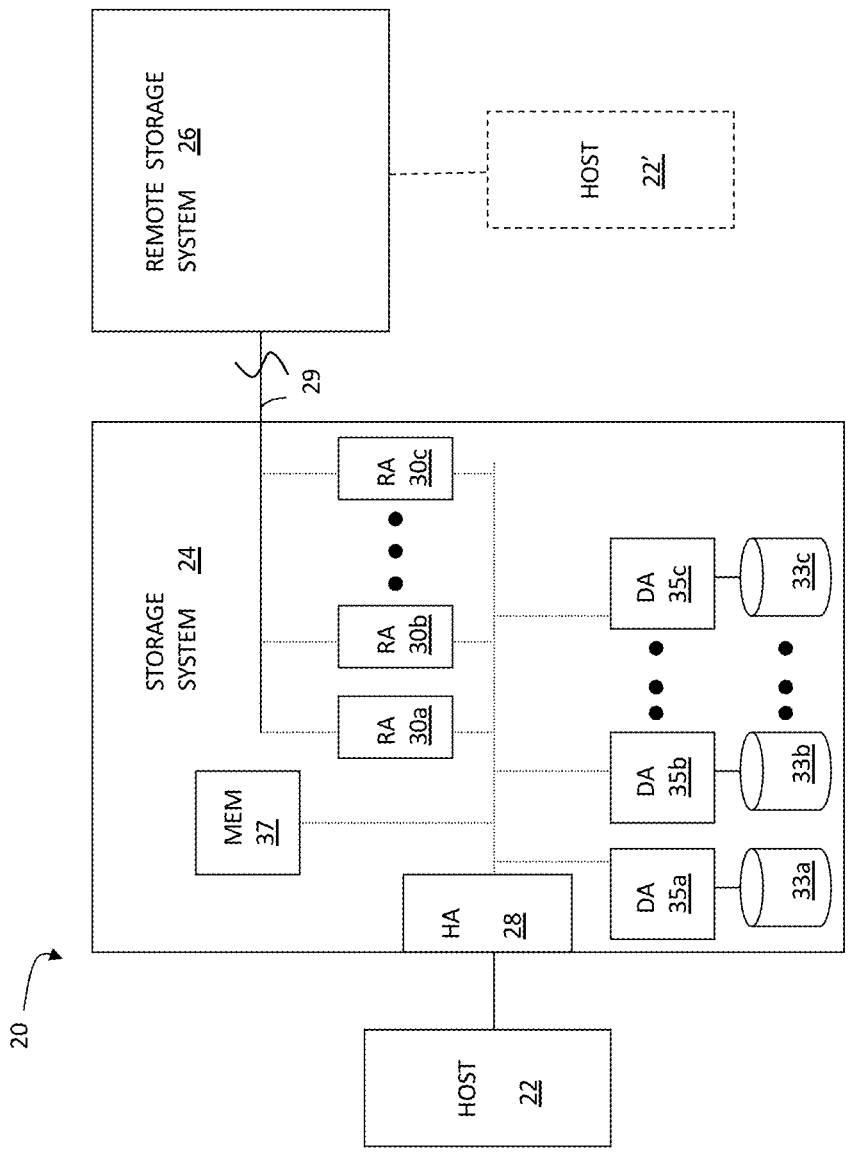
FIG. 1 is a schematic illustration showing a relationship between a host and a storage system that may be used in connection with embodiments of the system described herein.

System administrators may subdivide available storage resources of a storage system into many logical storage units. A logical storage unit (LSU) may be any of a logical volume, logical block, LUN (i.e., logical device or logical disk), thin device, groups of logical devices (e.g., storage group), NVMe namespace, or other type of logical device used for storage systems. For example, a PowerMax™ storage system made available from EMC Corp. of Hopkinton, Mass. (Dell EMC) may be configured to divide available storage resources into many LUNs, each with its own addressable space defined in logical blocks addresses (LBAs). Enterprise-grade applications may be configured in such way to leverage the most out of the underlying storage configuration, and sometimes even determine how the storage should be configured. Consequently, LSU configurations might even be different for the same application running at different locations. For instance, a database administrator (DBA) working at a first financial institution might configure the LSUs for the database management system (DBMS) different from how a DBA at a second financial institution would configure LSUs.

Data access patterns also vary with time and reflect aspects of the seasonality of the operations associated with them. Therefore, factors such as how a storage system is divided into LSUs and how the LSUs are accessed over time may affect cache policies, which may be adaptive and optimized to account for changes in data access patterns. Furthermore, it is often desirable that cache management policies have relatively small computation costs (small CPU and memory usage) to avoid performance hindrances in storage systems. Hundreds or even thousands of requests might occur within a second, which makes heavy computations undesirable at best, infeasible at worst.

A read request received from a host may specify an LSU, a starting logical block address (e.g., LBA) within the LSU and a length of the data to be read, which may be mapped to one or more pages of the logical storage device (alternatively, the read request itself may specify pages or a starting page instead of an LBA). A page is a unit of data of an LSU, e.g., a smallest unit of data of an LSU. Each page represents a logical address range of the LSU, each page having a same predefined length. For example, an LSU may be divided into a plurality of pages having a size of 128 kB, 512 kB, 2 MB, or 4 MB.

The pages may be designated by page numbers that reflect a position of the page within an ordered sequence of pages of the LSU. Consider the following primitive example for purely illustrative purposes. A LUN having a capacity of 64 KB, i.e., a cumulative address range of 0-64 KB, and page size of 8 KB, may have pages 1-8 as illustrated in the table below:

| Page No. | Address Range |
| --- | --- |
| 0 | 0-8 KB-1 |
| 1 | 8 KB-16 KB-1 |
| 2 | 16 KB-24 KB-1 |
| 3 | 24 KB-32 KB-1 |
| 4 | 32 KB-40 KB-1 |
| 5 | 40 KB-48 KB-1 |
| 6 | 48 KB-56 KB-1 |
| 7 | 56 KB-64 KB-1 |

Consecutive page numbers may represent sequential pages. For example, pages 1 and 2 are sequential, and pages 4-6 are sequential. The closer the page numbers of two pages (e.g., the less the difference between the page numbers of the pages), the more sequentially proximate the two pages may be considered. For example, pages 6 and 8 may be considered more sequentially proximate than pages 1 and 4 because 8−6=2 is less than 4−1=3. Conversely, pages 1 and 4 are considered more sequentially distant from each other than pages 6 and 8.

Described herein are pre-fetching techniques that determine what data, if any, to pre-fetch on a per-LSU basis, where, for a given LSU, what, if any, data to prefetch is based at least in part on a collective sequential proximity of the most recently requested pages of the LSU (e.g., the pages specified in, or corresponding to, the most recent read requests for the LSU). Determining what, if any, data to pre-fetch for an LSU may include determining a value for a proximity metric indicative of the collective sequential proximity of the most recently requested pages, comparing the value to a predetermined proximity threshold value (PTV), and determining whether to pre-fetch one or more pages of the LSU based on the result of the comparison.

In some embodiments, a data structure may be maintained that includes the most recently requested pages (also referred to herein as the most recent pages requested) for each of one or more LSUs. The data structure may be a table, and may be referred to herein as a most recent pages (MRP) table. The MRP table may include a plurality of entries (i.e., MRP queues), each entry corresponding to a respective LSU. Each entry may include a predefined number of fields, one or more of the fields holding a value (e.g., a page number) indicative of one of the most recently requested pages of the LSU. The MRP table may be a hash-like structure indexed by LSU ID, such that each entry may be accessed using an ID of the LSU corresponding to each entry.

Determining a proximity metric value for an LSU may include accessing the entry of the MRP table corresponding to the LSU, for example, in response to receiving a read request for the LSU. The entry may be updated, including, for example, adding a page number representing a page (e.g., a first page) of the received read request to a field of the entry. In some embodiments, the entry may be full (i.e., at capacity) in that all of the predefined number of fields have values specifying a page number, in which case the page value in one or more fields is discarded before adding a page number for the current read request, as described in more detail herein. The number of page values that are discarded from an MRP queue in response to a read request when the MRP queue is full may be defined by a parameter referred to herein as a discard number value (DNV).

Determining the proximity metric may include, after updating the corresponding entry of the MRP table, sorting the one or more fields of the entry according to a sequential order of the pages within the LSU, to produce a sorted MRP sequence of pages. It then may be determined, for each pair of consecutive pages in the sorted MRP sequence, whether the page numbers of the pages are different. If the page numbers are different, then a difference count may be incremented by 1, and it may be determined if the difference between the pages is less than or equal a pre-defined look-ahead threshold value (LATV), which may be specified for the LSU or the system as a whole. Is some embodiments, the LATV may be the same value as a look-ahead value (LAV), i.e., a value indicative of a number of next pages to pre-fetch for the LSU. In other embodiments, the LATV may be a different value. If the page difference (e.g., 2) is less than or equal to the LATV (e.g., 3), a pre-fetch hit count may be incremented by 1. If the LATV=LAV or is very nearly the same value, the resulting value of the pre-fetch hit count may represent, roughly, the number of read cache hits that would have resulted for the most recently read pages of the MRP queue if a pre-fetch operation using the LAV were performed for all of the corresponding read requests. In an embodiment herein, the values for LAV and LATV may be set based on an observed maximum reasonable number of pages that may be pre-fetched without adversely affecting system performance.

The proximity metric value may be the result of dividing the pre-fetch hit count by a difference count; i.e., the proportion or ratio of the pre-fetch hit count to the difference count. The number of page fields to include in an MRP queue; i.e., a the maximum number of most recent pages requested to consider when determining the proximity metric value, may be specified by an MRP size parameter value. In some embodiments, each of one or more pre-fetch parameters, including, for example, MRP size, LATV, DNV and PTV may be maintained and modified to adjust pre-fetching behavior, as is described in more detail herein.

In some embodiments, it is possible to diminish processing overhead by persistently maintaining a separate, sorted, version of each MRP queue in the MRP table that is synchronized with the MRP table, thus eliminating the need to produce a sorted MRP sequence of pages (described above) on every iteration. This is described in more detail elsewhere herein.

Although the MRP queue may be the same size for each of the LSUs, it is also possible to provide different size MRP queues for each of the LSUs and to also dynamically adapt the size of each of the MRP queue based on an expected lifetime of pages in the cache. Dynamically adjusting MRP queue sizes may use an admission timestamp (time that each page was admitted to the cache) to estimate a duration of pages in the cache, and a cache check, which determines if a page being removed from the MRP table is still in the cache. This is described in more detail elsewhere herein.

Illustrative embodiments of the invention will now be described in more detail in relation to the figures.

FIG. 1 is a diagram 20 showing a relationship between a host 22 and a storage system 24 that may be used in connection with an embodiment of the system described herein. In an embodiment, the storage system 24 may be a PowerMax or VMAX storage system produced by Dell EMC of Hopkinton, Massachusetts; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
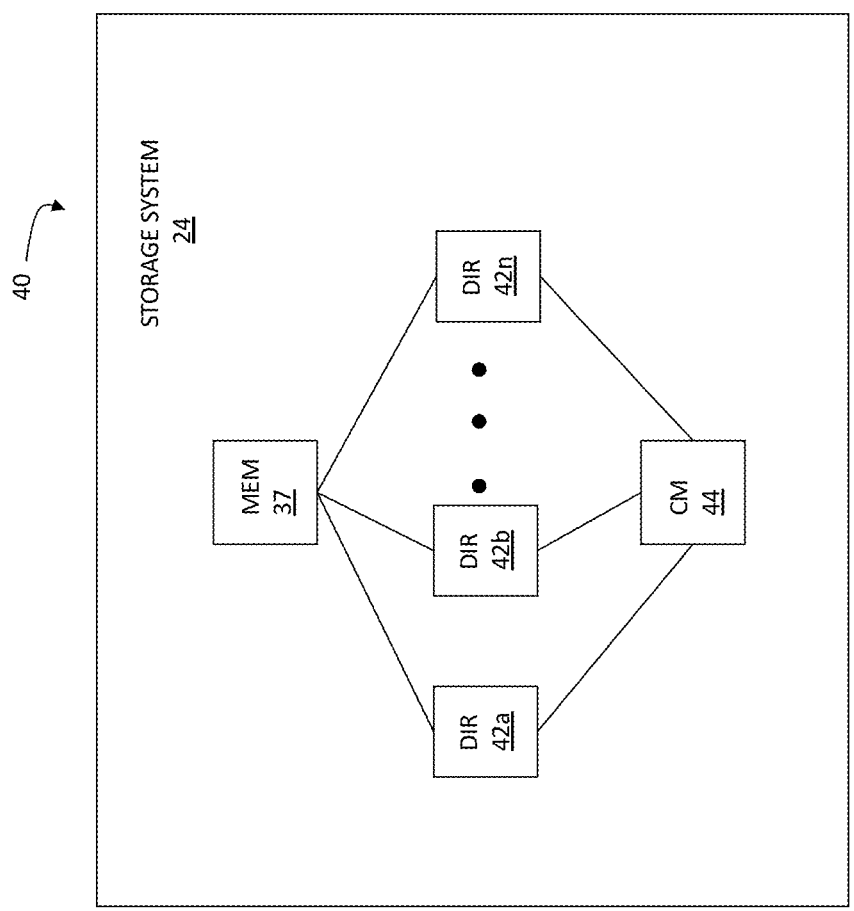
FIG. 2 is a schematic diagram illustrating a storage system where each of a plurality of directors are coupled to a memory according to embodiments of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

The storage system 24 may include a cache that stores data from the physical storage units 33a-33c. The cache may be implemented using the global memory 37 or other memory space of the storage device 24. The cache includes a plurality of cache slots of a predetermined size (e.g., 128 k bytes) that each store a correspondingly sized portion of the data from the physical storage units 33a-33c. Data written by the host 22 to the storage system 24 may be initially written to the cache and subsequently destaged to the physical storage units 33a-33c. Similarly, data read from the physical storage units 33a-33c may be placed in the cache. The cache is used because it is expected that the data that is accessed is expected to be accessed again and because accessing data in the cache is much faster than accessing data at the physical storage units 33a-33c. Thus, for example, the host may read data that is initially transferred from the physical storage units 33a-33c to the cache. For subsequent accesses of the data by the host 22, the storage system 24 provides the data from the cache without needing to access the physical storage units 33a-33c. At some point, the data may be removed from the cache because it hasn't been accessed recently and the corresponding cache slot is needed for more recently accessed data.

In some embodiments, data may be pre-fetched into the cache prior to being accessed in anticipation of the data being requested. A cache policy may control whether and how much data is pre-fetched. In some embodiments, the policy may depend, at least in part, on the logical storage unit (LSU) of the data so that a determination of whether and how much data to pre-fetch is made on a per LSU basis. The data that is pre-fetched may be data that is proximal to data that has already been accessed. Thus, for example, if a host accesses data block X, data block X+1, and data block X+2, the system may prefetch data blocks X+3 through X+10 in anticipation of those data blocks being accessed in the future.

In some embodiments, one or more parameter values may be provided for pre-fetching per LSU. For example, FIG. 3A is a block diagram illustrating a data structure 300 for storing pre-fetch parameter values, according to embodiments of the system described herein. Other embodiments of a data structure for storing pre-fetch parameter values, for example, variations of data structure 300, are possible and intended to fall within the scope of the invention. The data structure 300 may be referred to herein as the pre-fetch parameter data structure (PPDS) and the pre-fetch parameter values stores therein as pre-fetch parameter (PP) values.

The PP values may include any of: an MRP (most recent pages) size value 302; an LATV (look-ahead threshold value) 304, a DNV (discard number value) 306 and a PTV (proximity threshold value) 308. The MRP size value 302 may specify a number of most recent pages requested for an LSU to consider when determining whether to perform a pre-fetch operation for the LSU in response to a read request for the LSU; i.e., how far to look back when making a determination. The MRP size value 302 may be used to determine a number of page entry fields for each MRP queue of an MRP table. The MRP size value 302 may be selected to correspond to an expected lifetime of a corresponding page in the cache (i.e., before being evicted from cache), and may be adjusted to modify pre-fetch behavior, as described in more detail elsewhere herein.

The LATV 304 may be set equal to a look-ahead value (LAV) indicative of a number of next pages to pre-fetch for a corresponding LSU for a pre-fetch operation. The LATV 304 may be compared to a difference between page numbers of a consecutive pair of pages in a sorted MRP sequence to determine whether to increment the prefetch hit count, as described in more detail elsewhere herein. In some embodiments, the LATV 302 may be a different value than the LAV, but still compared to a difference between page numbers of a consecutive pair of pages in a sorted MRP sequence to determine whether to increment the prefetch hit count. The LATV 302 may be adjusted to modify pre-fetch behavior as described in more detail elsewhere herein.

The DNV 306 may specify the number of page values that are discarded from an MRP queue for an LSU in response to a read request for the LSU when the MRP queue is full. The DNV 306 may be defined, and adjusted to modify pre-fetch behavior, as described in more detail elsewhere herein.

The PTV 308 may specify a proximity threshold value to be compared against a proximity metric value for an LSU in response to receiving a read request for the LSU to determine whether one or more pages are to be pre-fetched for the LSU in addition to fetching the one or more pages of the read request. The PTV 306 may be adjusted to modify pre-fetch behavior as described in more detail elsewhere herein.

FIG. 3B is a block diagram illustrating an example of an MRP (most recent pages) table 350. Other embodiments of a data structure for recording most recent page requests for LSUs, for example, variations of MRP table 350, are possible and intended to fall within the scope of the invention.

The MRP table 350 may include a plurality of entries (queues), including MRP entries 352, 354, 356, where each entry corresponds to a respective LSU. Each of the MRP entries 352, 354, 356 may include a plurality of page fields in respective page columns 353, 355, 357, 359, 361. The number of page columns and page fields per entry may be configured to the value of the MRP parameter 302. Each of the MRP entries 352, 354, 356 may be considered to hold a current MRP sequence for a corresponding LSU; i.e., the most recent (i.e., last) pages requested for the corresponding LSU. The most recent pages requested for an LSU means the pages corresponding to (i.e., specified by or mapped from logical address specified by) the most recent (i.e., last) read requests of the LSU. The order of the pages specified with a current MRP sequence may be the order in which the pages were received, reflected in an MRP queue from left to right; i.e., in the order illustrated by the page columns 353, 355, 357, 359, 361. For example: the order of the MRP sequence stored in the MRP queue 352 is 78, 4, 5, 7, 7; the order of the MRP sequence stored in the MRP queue 354 is 79, 10, 17, 15; and the order of the MRP sequence stored in the MRP queue 356 is 20, 81, 4, 6 and 30.

Each of the MRP entries 352, 354, 356 may initially have no page values specified in the page fields for the page columns, which may be populated over time as read requests are received for the LSUs, for example, as illustrated in FIGS. 4A-4F, described below.

FIGS. 4A-4F illustrate populating a data structure for recording most recently requested pages for LSUs in response to receiving read requests, according to embodiments of the system described herein. In FIGS. 4A-4F, and elsewhere herein, an MRP (most recent pages) size may be referenced by the variable w, and the DNV (discard number value) may be referenced by the variable z. Page requests 402 are illustrated as being received over time from left to right. Furthermore, as used in reference to FIGS. 4A-4F and elsewhere herein, for an ordered sequence of page requests, r1, r2, . . . , rn in a storage system, each request ri may be represented as a tuple (LSUid, p), where LSUid is a unique identifier of an LSU (e.g., logical device or thin device) and p is a page within a corresponding LSU.

An MRP table 403 in FIGS. 4A-4F includes a plurality of MRP entries 404, 406, 408 for LSUs A, B and C, respectively, each holding a current MRP sequence for the corresponding LSU for the last w requested pages for the respective LSU. For example, the MRP entries 404, 406, 408 may correspond to the MRP entries 352, 354, 356, discussed above, at another point in time. The size w of the MRP entries may be configured relative to an expected lifetime of pages in the cache of the storage system 24, as described in more detail elsewhere herein. In the example of FIGS. 4A-4F, w=5.

Figure 4A:
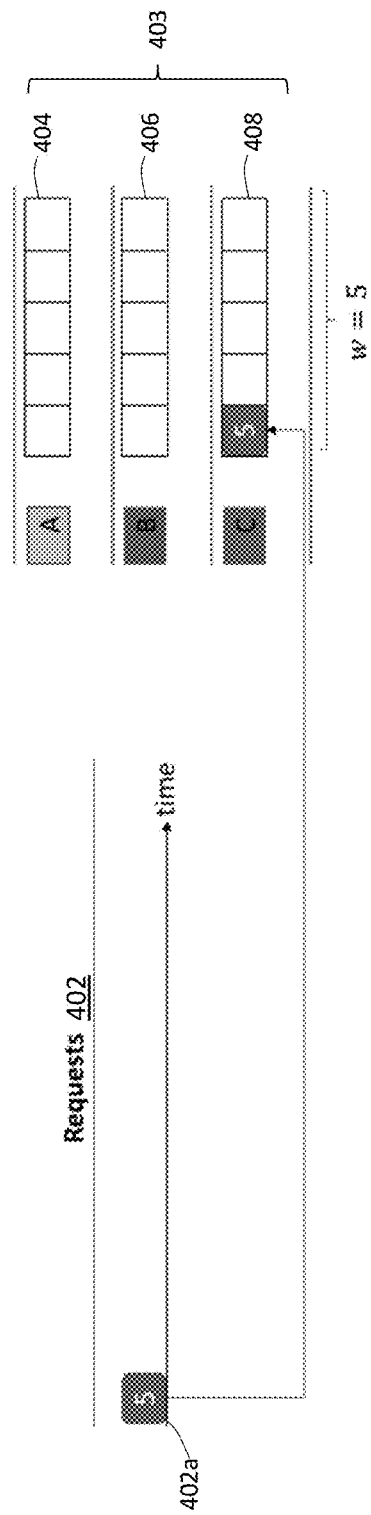

FIG. 4A illustrates the MRP queue 408 of LSU C being populated in response to a first page request 402a, $r_0$=(C, 5) for LSU C.

Figure 4B:
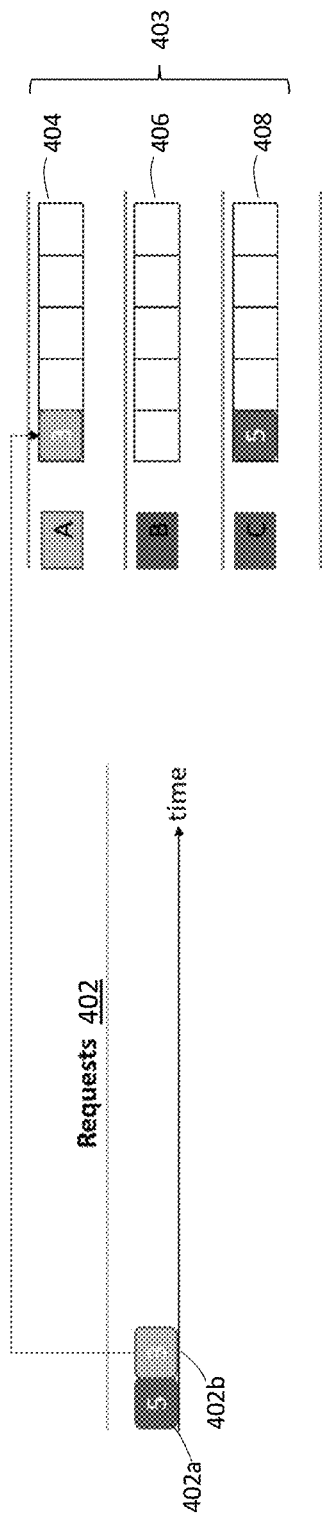

FIG. 4B illustrates an example the MRP queue 404 of LSU A being populated in response to a first page request 402b r1=(A, 3) for LSU A.

FIG. 4C represents a later point in time, after which a plurality of page requests 402c-e have been received for LSU C, resulting in further population of the MRP queue 408 as shown. As illustrated, the page fields of the MRP queue 408 are populated with the page numbers of the page requests received from left to right in the order in which the page requests are received, as described above in relation to the MRP table 403. It may be desirable to order the page field values in this manner for dealing with MRP queue overflow, i.e., when a page request is received for an LSU having a full MRP queue.

When the MRP queue of an LSU is full (i.e., it holds exactly w page numbers) and another request ri(LSUid, x) is made (for a variable page x), the following may be performed:
1. Clear the first z elements of the MRP queue of the LSU; and
2. Store page number of page x in the MRP queue of the LSU.

As described in more detail elsewhere herein, z, the DNV (discard number value), may be defined relative to the size, w, of an MRP queue, with a value: $1 \leq z \leq w$. The DNV, z, specifies the number of page field values (i.e., page numbers) discarded (and thus dictates how many page numbers are kept) when an MRP queue is full. The page numbers of the oldest z request(s) may discarded, which is why it may be desirable to order the page field values as described. In an embodiment herein, z (DNV) is set to 50% of the entries in the MRP queue, but of course, different values for z may be used based on, for example, empirical observations/data.

FIG. 4D represents a later point in time, after which a plurality of page requests 402f-j have been received for the LSUs A, B and C resulting in further population of the MRP queues 406, 404, 408, as shown. Also, additional page requests were previously received for LSU A before the page requests 402f-j, and the MRP queue 404 is populated accordingly. The MRP queue 408 for LSU C is shown as full in FIG. 4D.

Figure 4E:
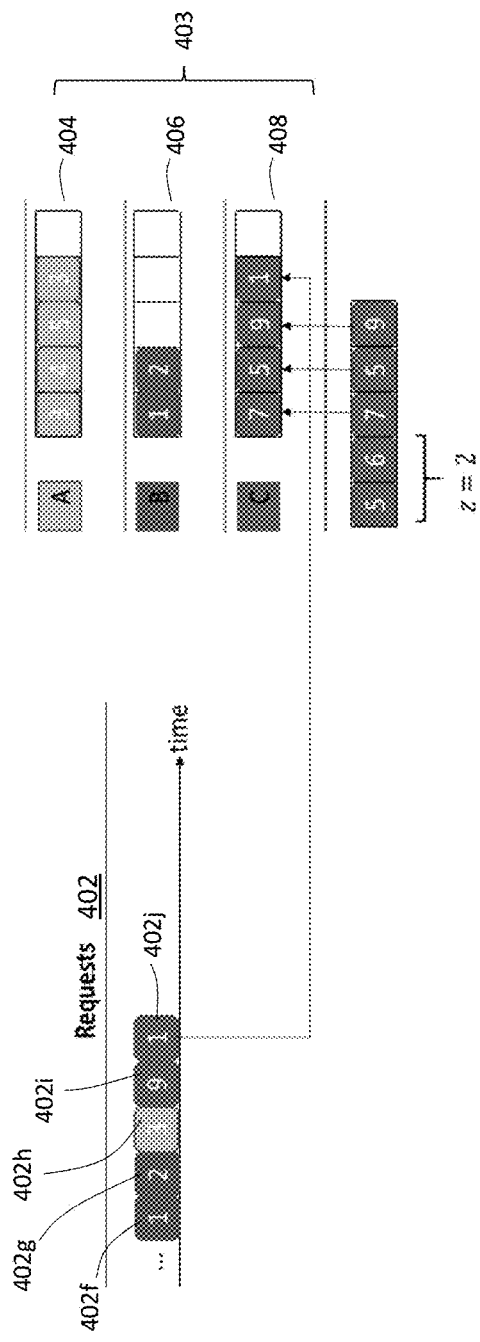

FIG. 4E illustrates a resulting state of the MRP table 403 after receiving a request for an LSU with a full MRP queue. In this example, z=2. As illustrated, the two oldest pages, page numbers 5 and 6, of the MRP queue 408 of LSU C are discarded.

Figure 4F:
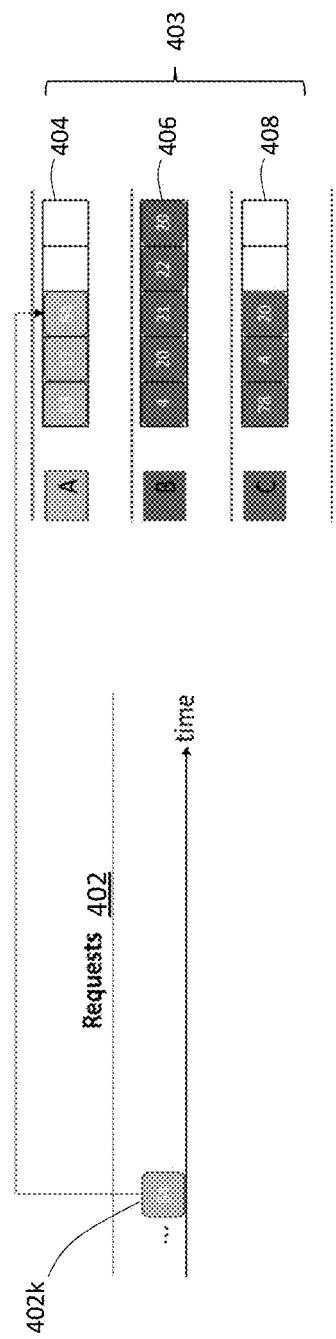

FIG. 4F represents a much later point in time, after which several other page requests have been received for each of LSUs A, B and C, a latest being a page request 402k, with which the MRP queue 404 is populated. The state of the MRP table 403 in FIG. 4F may be representative of a typical state of an MRP table after sufficient time has passed such that each of the MRP queues 404, 406, 408 have at least z+1 page numbers specified.

In some embodiments, the value of z (DNV) is defined to be approximately 50% of the size of an MRP queue, which experiments have shown yields desirable results. Consider an edge case where z=w. This would mean clearing an entire MRP queue in response to an MRP queue overflow, which has been found to cause changes that are too abrupt in sequential proximity recognition for an LSU, and results becoming too sensitive to small changes in the order of requests.

Conversely, consider an other edge case, where z=1. This necessitates modifying the MRP queue of an LSU in a sliding window fashion for every page request received (after MRP capacity is reached for a first time). It is more computationally efficient when 1<z<w, in which case pages for new request are added to an MRP queue up to w and then z>1 elements are cleared all at once. When z=1, one element is deleted and one added for every single page request.

Figure 5:
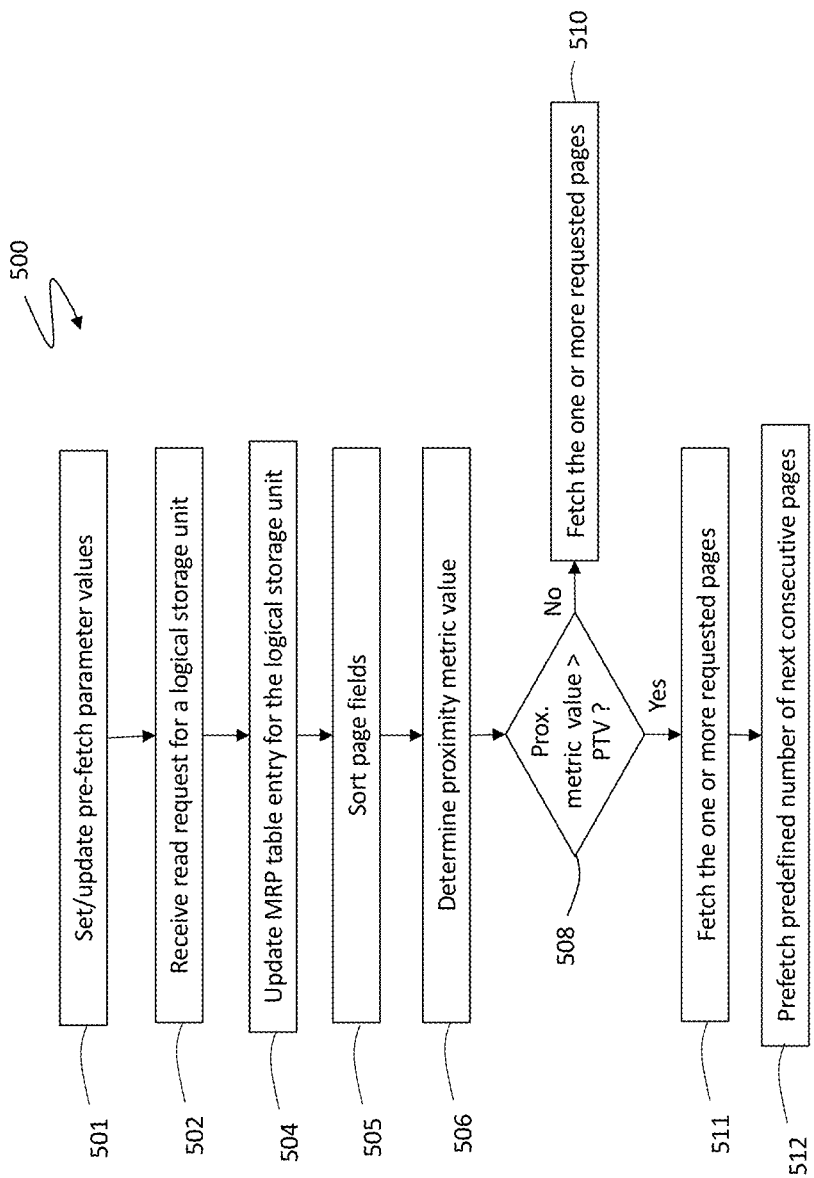
FIG. 5 is a flowchart illustrating determining whether to pre-fetch data for a logical storage unit based on a collective sequential proximity of most recent read requests for the logical storage unit, according to embodiments of the system described herein.

FIG. 5 is a flowchart 500 illustrating determining whether to pre-fetch data for an LSU based on a collective sequential proximity of most recent read requests for the LSU, according to embodiments of the system described herein. Other embodiments of a method of determining whether to pre-fetch data for an LSU are possible and intended to fall within the scope of the invention.

Processing begins at a step 501 where one or more pre-fetch parameter values may be set or updated, for example, any of the PP (pre-fetch parameter) values described herein, including MRP size, LATV, DNV and PTV, any of which may be stored in the PPDS 300, described above. Following the step 501 is a step 502 where a read request may be received for an LSU, for example, from a host. The read request may specify one or more pages of the LSU or one or more logical addresses (e.g., LBAs) and/or data lengths that map to one or more pages of the LSU. Following the step 502 is a step 504 where the MRP table entry for the LSU may be updated, for example, as described in relation to FIGS. 4A-4F. The step 504 may include adding a page value for a page of the read request to a field of the MRP table entry. In some embodiments, if the MRP table entry is full, one or more page field values may be discarded, the number of which may be specified by a DNV.

Following the step 504 is a step 505 where the page fields of the MRP table entry may be sorted into a sorted MRP sequence. The sorted MRP sequence may order the pages of the MRP table entry according to their sequence in the LSU, for example, which is described in more detail elsewhere herein. Following the step 505 is a step 506 where a proximity metric value indicative of a collective sequential proximity of the pages of the MRP queue (now sorted as a sorted MRP sequence) may be determined. Determining the proximity metric at the step 506 is described in more detail elsewhere herein. Following the step 506 is a step 508 where it is determined whether the determined proximity metric value from the step 506 is greater than a pre-defined PTV (proximity threshold value). If it determined at the step 508 that the proximity metric value is greater than the PTV, control transfers to a step 511 where one or more requested pages corresponding to the read request are fetched into the cache. Following the step 511 is a step 512 where a predefined number (e.g., =LAV) of one or more next consecutive pages of the LSU are pre-fetched into the cache. Following the step 512, processing is complete. If it determined at the step 508 that the proximity metric value is not greater than the PTV, then control transfers to a step 510 where one or more requested pages corresponding to the read request are fetched into the cache. Note that, in this case, no pages are pre-fetched. Following the step 510, processing is complete. Processing illustrated by the flow diagram 500 determines whether an LSU is currently in the midst of a sequential pattern of workload, for example, by determining a proportion (i.e., percentage) of most recently requested pages that are within the reach of the LAV (e.g., when LATV=LAV) for the LSU.

FIG. 6 illustrates in more detail processing at the step 505, described above. An MRP queue 602 is sorted into a sorted MRP sequence 604. As illustrated in FIG. 6, the original sequence represented by the MRP queue 602 includes page numbers {78, 4, 5, 7, 7}. The order from left to right in the entry 602 may be the order in which the read requests corresponding to the pages represented by page numbers 78, 4, 5, 7, 7 were received at the storage system. Sorting the MRP sequence according to page number, e.g., according to the sequential order of the pages in the LSU results in sorted MRP sequence 604: {4, 5, 7, 7, 78}. Any appropriate sorting mechanism may be used.

Figure 7:
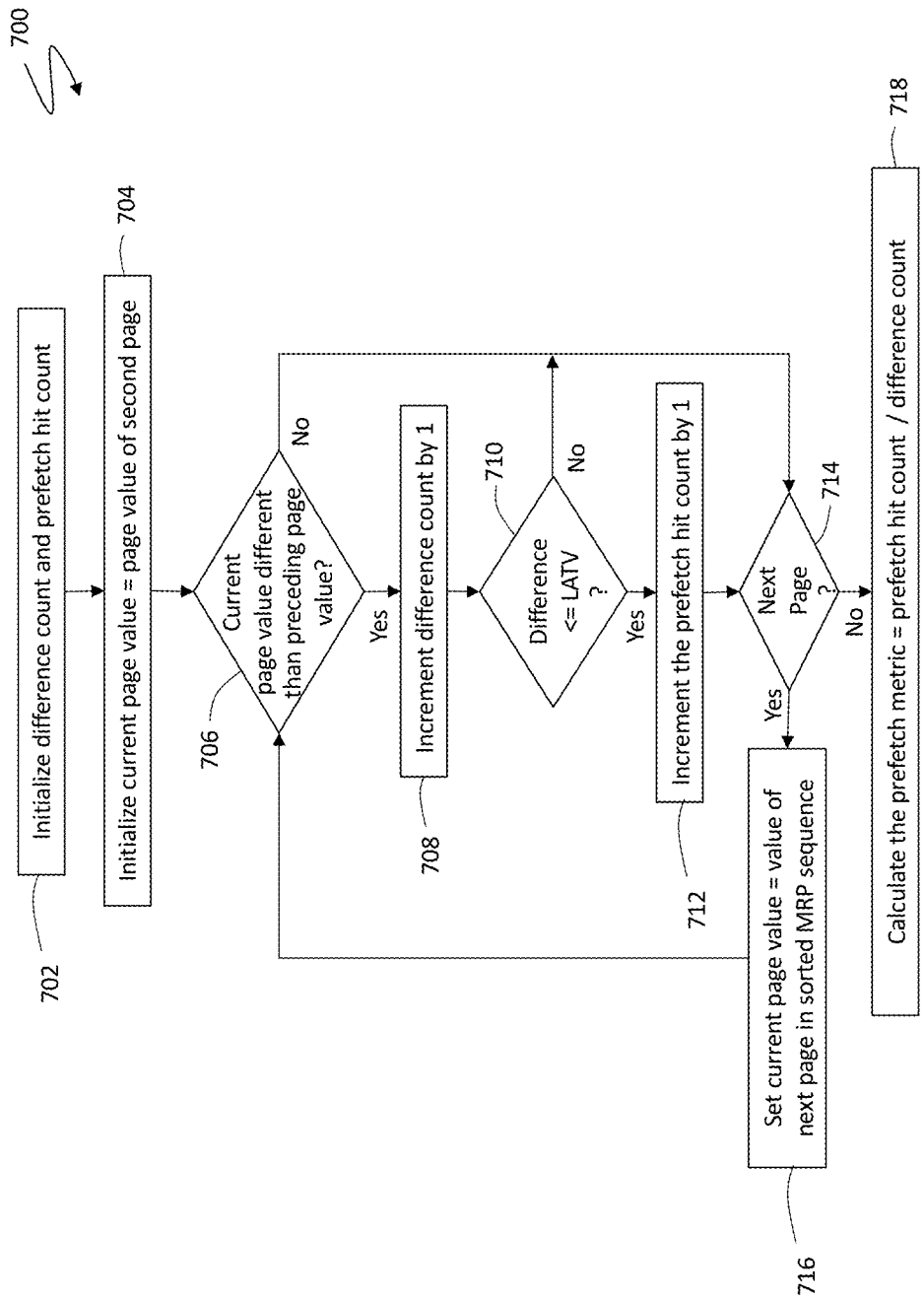
FIG. 7 is a flowchart illustrating determining a proximity metric value for recent page requests of a logical storage unit, according to embodiments of the system described herein.

FIG. 7 is a flowchart 700 illustrating in more detail processing at the step 506, described above, where the proximity metric value indicative of a collective sequential proximity of the pages of the MRP queue (now sorted as a sorted MRP sequence) is determined. Note that other embodiments of a method of determining a proximity metric value for the most recent page requests of an LSU are possible and intended to fall within the scope of the invention. Processing begins at a step 702 where a difference count value and prefetch hit count value may be initialized, e.g., set to zero. Following the step 702 is a step 704 where a current page value may be initialized to a value of the second page of the sorted MRP sequence.

Following the step 704 is a step 706 where it is determined whether the current page value is different than a value of a page immediately preceding the current page in the sorted MRP sequence. For example, on a first pass through the loop, the step 706 may determine whether the second page value is different than the first page value of the sorted MRP queue. If it is determined at the step 706 that the current page value is different than a value of the page immediately preceding the current page in the sorted MRP sequence, then control transfers from the test step 706 to a step 708 where the difference count is incremented by one. Following the step 708 is a step 710 where it is determined whether the difference between the current page value and the previous page value is less than or equal to an LATV (look-ahead threshold value).

If it is determined that the difference between the current page value and the previous page value is less than or equal to an LATV, then control transfers from the test step 710 to a step 712 where the pre-fetch count is incremented by one. Following the step 712 is a test step 714 where it is determined whether there is a next page in the sorted MRP sequence (i.e., if all of the pages have been processed). The step 714 also may be reached directly from the step 706 if it is determined at the step 706 that the current page value is not different than a value of the page immediately preceding the current page in the sorted MRP sequence; i.e., that the page values are the same. The step 714 also may be reached directly from the step 710 if it is determined at the step 710 that the difference between the current page value and the previous page value is greater than the LATV. If it is determined at the step 714 that there is a next page in the sorted MRU sequence, then the current page value is set to the value of the next page in the sequence, and control transfers to the step 706, discussed above, for another iteration. Otherwise, if it is determined at the step 714 that there is not a next page in the sorted MRU sequence, then control transfers to a step 718 where the prefetch metric is determined. The prefetch metric is the prefetch hit count divided by the difference count. Following the step 718, processing is complete.

It should be appreciated that, in the embodiment illustrated by the flowchart 700, zero-differences between consecutive page numbers of a sorted MRP sequence (i.e., when the page numbers are the same) are disregarded. That is, repeated page numbers in the sorted MRP sequence are not included in determining the difference count or the pre-fetch hit count. This may be desirable to do because repeated page requests do not result in cache hits due to prefetching. However, repeated page requests may indicate that such read accesses are locally clustered. By not counting such page requests for the prefetch count in addition to the difference count, penalizing the proximity metric value for an MRP sequence may be avoided.

The processing illustrated by the flowchart 700 may result in a high proximity metric value for an MRP sequence, which is indicative of a high collective sequential proximity of the MRP sequence, when such sequences include a relative few values repeated many times each. For example, an MRP sequence={8, 8, 8, 8, 9, 9, 9, 9} would return a proximity metric value of 1.0 for any value of LATV≥1 even though this kind of access pattern does not necessarily benefit from pre-fetching. However, in practice, such cases may be rare enough that they won't affect overall performance of the system. Furthermore, the processing illustrated by the flowchart 700 may be modified in a relatively straightforward manner to identify MRP sequences with too many repeated values and penalize the resulting proximity metric value, if desired.

Figure 8:
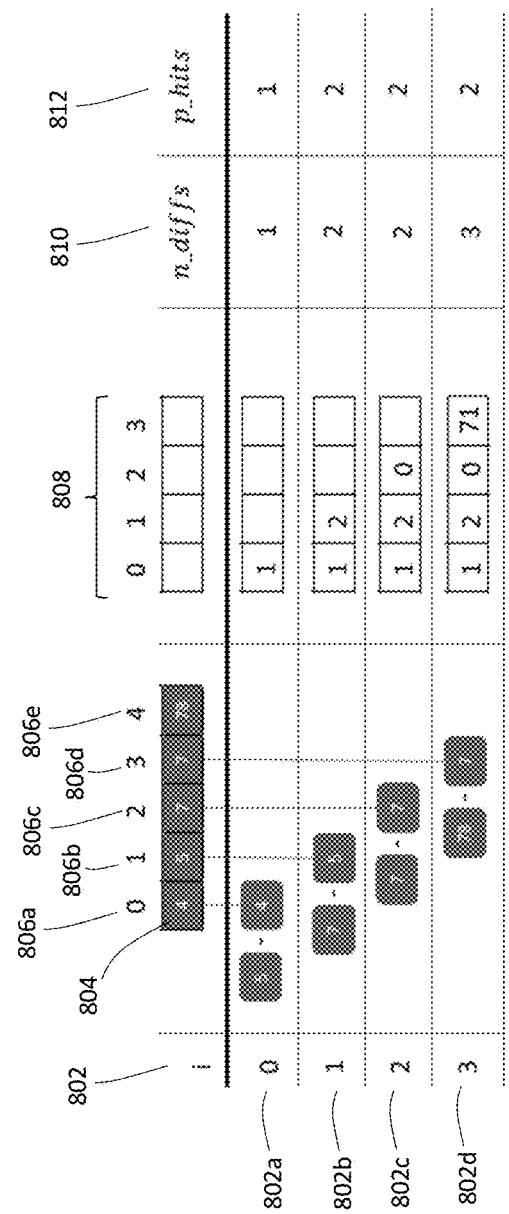
FIG. 8 illustrates calculating a proximity metric, according to embodiments of the system described herein.

FIG. 8 illustrates an example of calculating difference counts 810 and pre-fetch hit counts 810 for a sorted MRP sequence 804 (e.g., the sorted MRP sequence 604) by applying the processing illustrated by the flowchart 700, discussed above. In the example of FIG. 8, the MRP size=5 and LATV=2. The sorted MRP sequence 804 includes a plurality of elements 806a-f, having values 4, 5, 7, 7 and 78, respectively.

FIG. 8 shows a plurality of iterations 802 denoted by an iteration variable i, including iterations 0, 1, 2 and 3, of a loop defined by the steps 706, 708, 710, 712, 714, 716 of the flowchart 700. Each of a plurality of rows 802a, 802b, 802c, 802d represents results after iterations 0, 1, 2, and 3, respectively. A section 810 shows a calculated difference between successive page number values of the MRP sequence 804 for each of iteration 0, 1, 2 and 3. A column 810 shows a running difference count (n_diffs) after each iteration, and a column 812 shows a running possible pre-fetch hit count after each iteration.

Information in the row 802a indicates that, after performance of the first iteration (0) for a pair of the elements 806a, 806b:
the calculated difference=5−4=1,
the difference count=1, and
the pre-fetch count=1.
Information in the row 802b indicates that, after performance of the second iteration (1) for a pair of the elements 806b, 806c:
the calculated difference=7−5=2,
the difference count=2, and
the pre-fetch count=2;
Information in the row 802c indicates that, after performance of the third iteration (2) for a pair of the elements 806c, 806d:
the calculated difference=7−7=0,
the difference count=2, and
the pre-fetch count=2
(i.e., the difference count and pre-fetch count did not change because there was no difference);

Information in the row 802*d* indicates that, after performance of the fourth and final iteration (3) for a pair of the elements 806*d*, 806*e*:
the calculated difference=78−7=71,
the difference count=3, and
the pre-fetch count=2
(i.e., pre-fetch count did not change because 71>LATV (=2));

For the example illustrated in FIG. 8, the prefetch metric value may be determined as (pre-fetch hit count/difference count)=2/3=0.6667. Whether or not to perform a pre-fetch will depend on whether 0.6667 is greater than the PTV, a pre-determined threshold value.

Figure 9A:
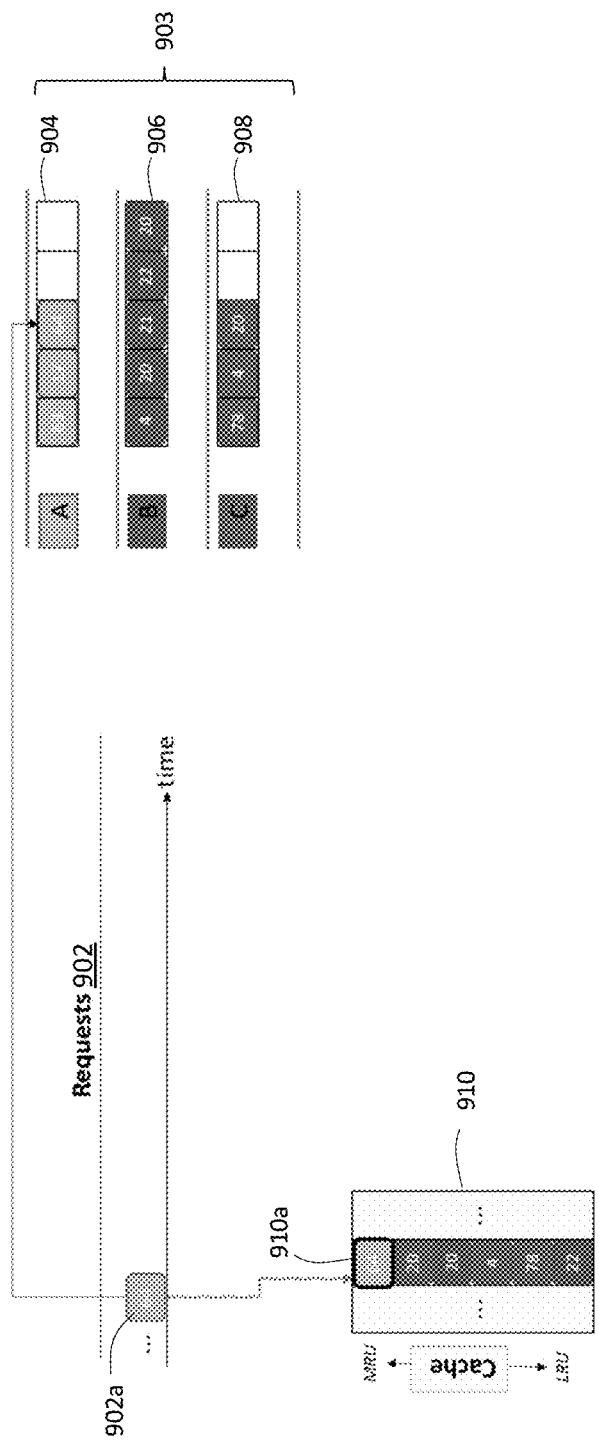
FIGS. 9A-9C illustrate determining whether to pre-fetch data for a logical storage unit based on a collective sequential proximity of most recent read requests for the logical storage unit, according to embodiments of the system described herein.
Figure 9B:
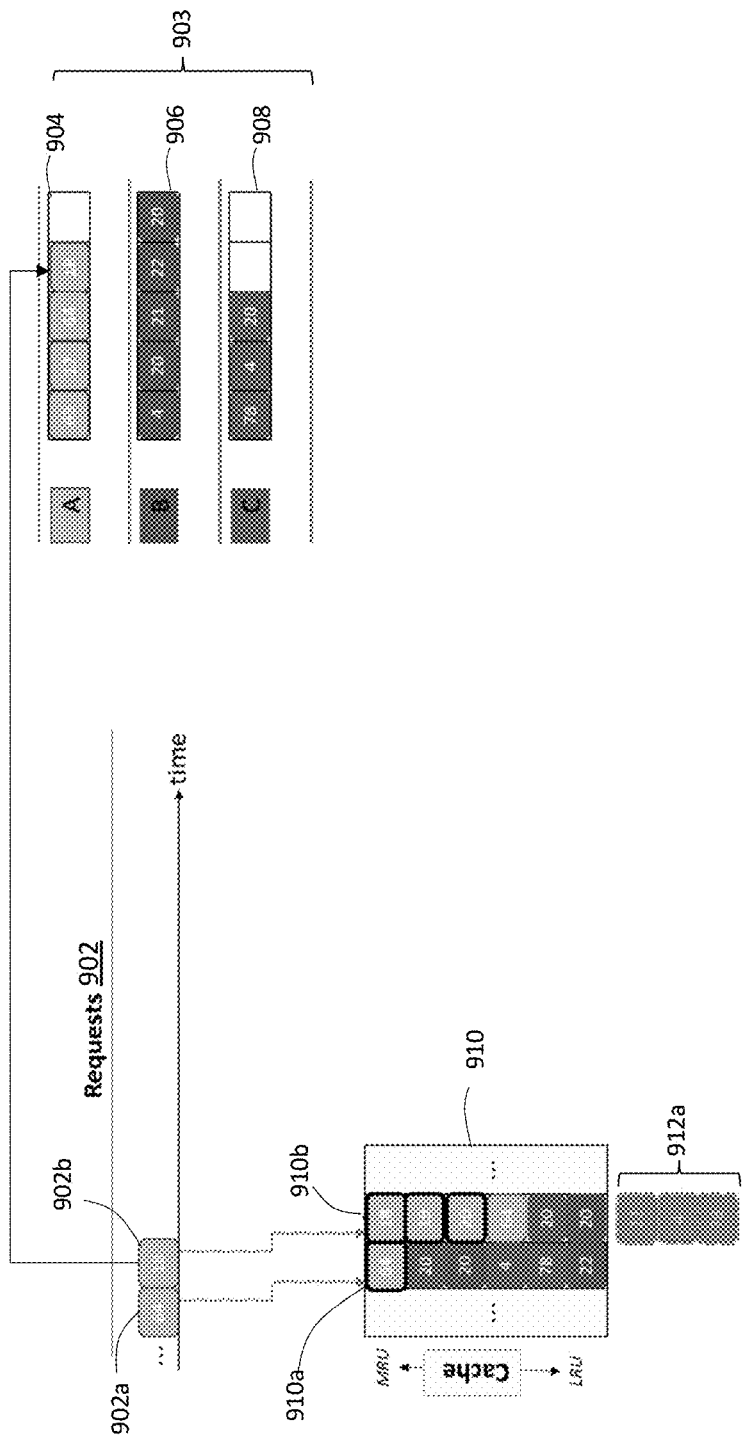
Figure 9C:
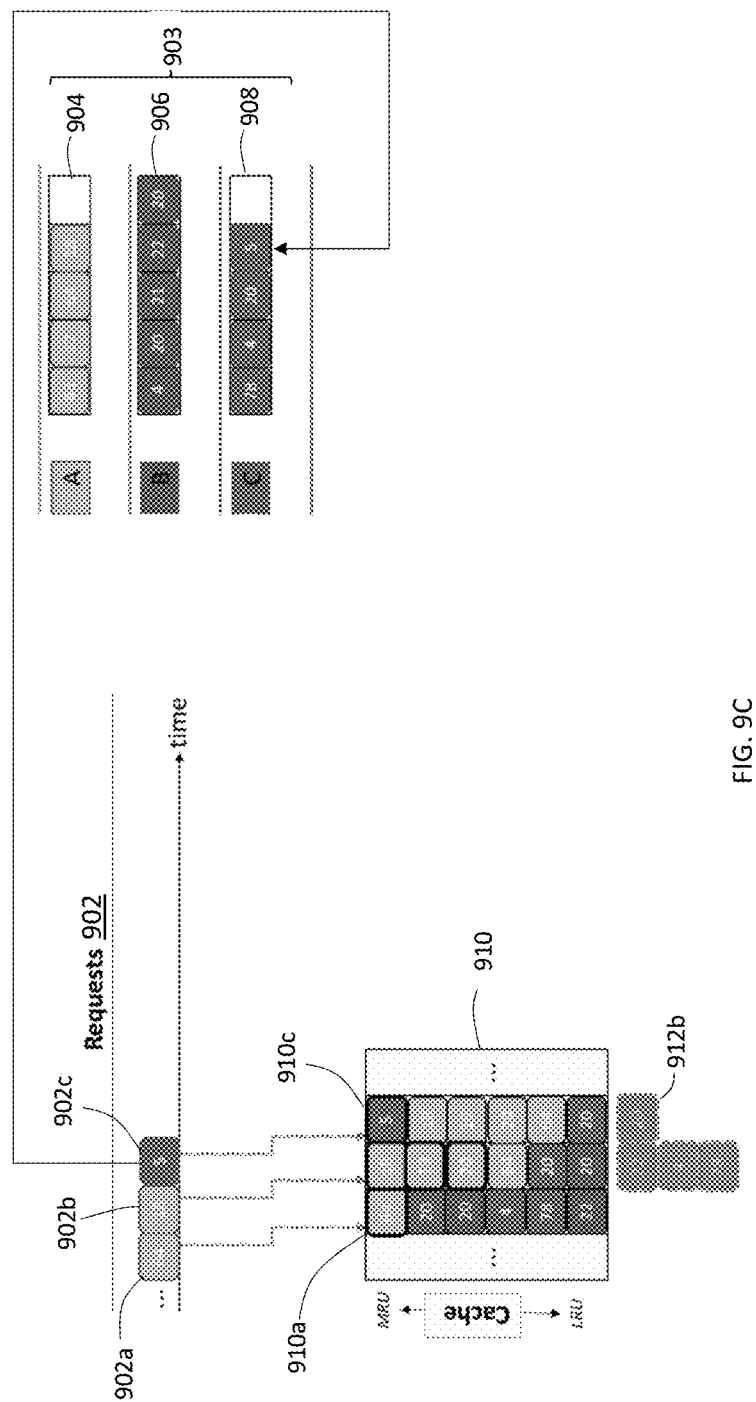

FIGS. 9A-9C illustrate examples of determining whether to pre-fetch data for a logical storage unit based on a collective sequential proximity of most recent read requests for the logical storage unit, using the mechanisms described herein. In FIGS. 9A-9C, a section 910 illustrates a state of a cache over time. LATV=2, PTV=0.5 and LAV=2.

FIG. 9A illustrates a state 910*a* of the cache and an MRP table 903 after processing a page request 902*a*. In the embodiment of FIG. 9A, an MRP queue 904 for LSU A is updated in response to the page request 902*a*, and a page corresponding to the page request is fetched into the cache as shown.

FIG. 9B illustrates a state 910*b* of the cache and the MRP table 903 after processing a page request 902*b* for the LSU A. The MRP queue 904 for LSU A is updated in response to the page request 902*b*. The MRP queue 904 then has page numbers={63, 17, 64 and 18}. Sorting the page numbers (per the step 505, discussed above) produces sorted MRP sequence: {17, 18, 63, 64}. Applying the step 506 (discussed above) results in a proximity metric value=0.667. Per the step 508, the proximity metric value 0.667 is determined to be greater than PTV=0.5. As a result, in addition to fetching a requested page into the cache, the system causes the next two pages 19 and 20 of LSU A (because LAV=2) to be pre-fetched into cache per the step 512, discussed above, resulting in updated state 910*b* of the cache and evicted entries 912*a*.

FIG. 9C illustrates a state 910*c* of the cache and the MRP table 903 after processing a page request 902*c* for the LSU C. The MRP queue 908 for LSU C is updated in response to the page request 902*c*. The MRP queue 908 then has page numbers={78, 4, 20 and 5}. Sorting the page numbers per the step 505 (discussed above) produces a sorted MRP sequence: {4, 5, 20, 78}. Applying the step 506 (discussed above) results in a proximity metric value=0.333. Per the step 508, the proximity metric value 0.333 is determined to be less than PTV=0.5, so no pre-fetching is performed and only a requested page is loaded into the cache, resulting in an updated state 910*c* of the cache and evicted entry 912*b*.

The example of FIG. 9C illustrates that, in embodiments of the invention, no pre-fetching may be made in response to a page request for an LSU, even though a recent sequentially proximate page request for the LSU is still in the memory of the system (i.e., recorded in the MRP table). Because the proximity metric value is computed over a sequence of page requests, a recent sequential state of the LSU is considered. It is known that workloads tend to fluctuate between sequential patterns, which benefit from pre-fetching, and random (non-sequential) patterns. By using a metric that takes into account the collective sequential proximity of recent LSU read accesses, pre-fetching in response to an LSU performing a single (or relatively few) sequentially proximate access can be avoided, for example, during a workload that is predominantly random.

Figure 10:
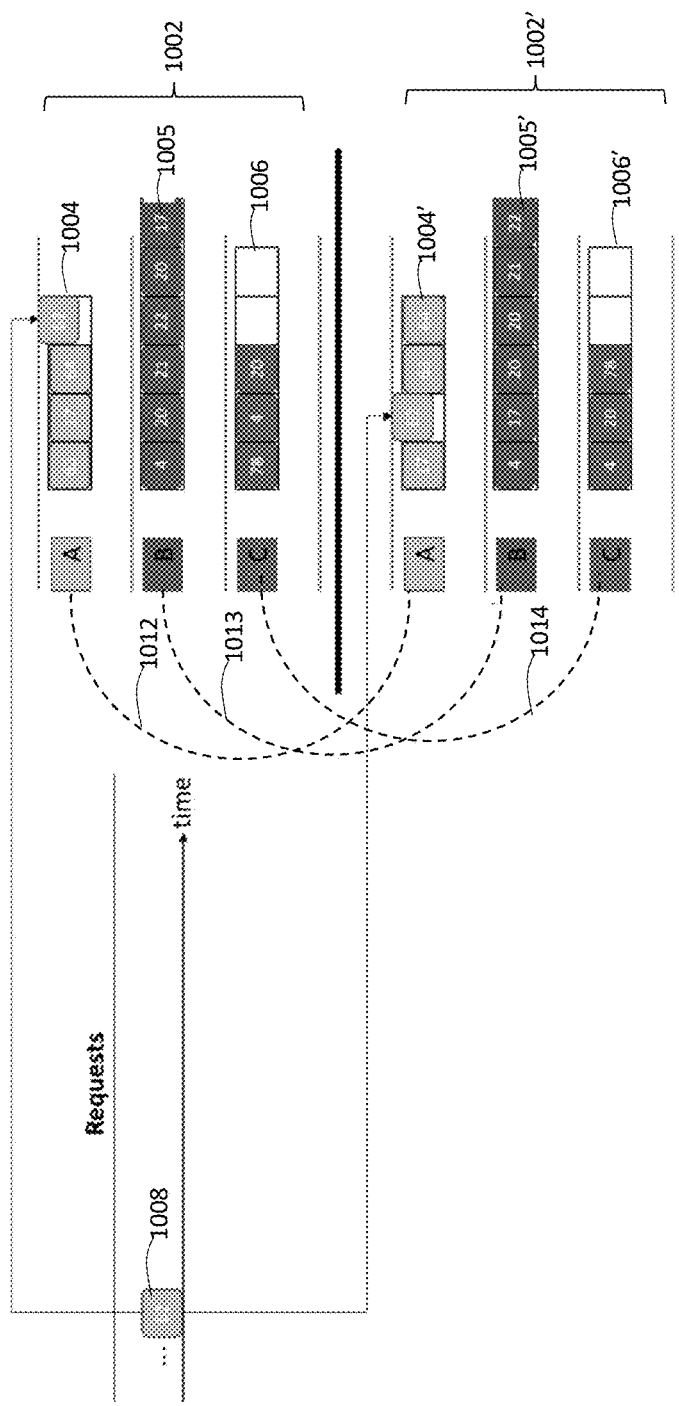
FIG. 10 is a schematic diagram illustrating using persistent sorted queues according to embodiments of the system described herein.

Referring to FIG. 10, an MRP table 1002 includes a plurality of MRP queues 1004-1006 for LSUs A, B and C, respectively, each holding a current MRP sequence for the corresponding LSU. The MRP table 1002 is similar to the MRP table 403 discussed above in connection with FIGS. 4A-4F. FIG. 10 also shows an alternative MRP table 1002' that corresponds to the MRP table 1002. The alternative MRP table 1002' includes a plurality of sorted MRP queues 1004'-1006' where the sorted MRP queue 1004' corresponds to the MRP queue 1004, the sorted MRP queue 1005' corresponds to the MRP queue 1005, and the sorted MRP queue 1006' corresponds to the MRP queue 1006. Each of the sorted MRP queues 1004'-1006' contains the same elements as a corresponding one of the MRP queues 1004-1006. However, in each of the sorted MRP queues 1004'-1006', the pages are sorted similar like the pages in the sorted MRP queue 604, discussed above, except that the sorted MRP queues 1004'-1006' are maintained (persist) for a plurality of iterations of page requests. In contrast, the sorted MRP queue 604 is only used one time for a single iteration and is discarded afterward.

FIG. 10 also shows receiving a page request 1008 for LSU A. The MRP queue 1004 for LSU A is updated with the page request 1008 in a manner similar to adding a page request that is illustrated in connection with FIGS. 4A-4F, discussed above. In addition, the page request 1008 is added to the sorted MRP queue 1004' in a position that maintains the sort sequence. The page request 1008 may be added to the sorted MRP queue 1004' using any appropriate mechanism, including conventional mechanisms for inserting elements into ordered lists that maintain the ordering.

In some embodiments, there may be a relationship between elements in each of the MRP queues 1004-1006 and corresponding ones of the sorted MRP queues 1004'-1006'. This is illustrated by a plurality of connecting arcs 1012-1014 where the arc 1012 shows a relationship between elements of the MRP queue 1004 and the sorted MRP queue 1004', the arc 1013 shows a relationship between elements of the MRP queue 1005 and the sorted MRP queue 1005', and the arc 1014 shows a relationship between elements of the MRP queue 1006 and the sorted MRP queue 1006'. Thus, it may be possible to access an element of one of the queues 1004-1006 and be able to access a corresponding element in one of the queues 1004'-1006'. Similarly, it may be possible to access an element of one of the queues 1004'-1006' and be able to access a corresponding element in one of the queues 1004-1006. Accordingly, when a read request is received for one of the queues 1004-1006 that is full, and the oldest z request(s) are discarded (see discussion above in connection with FIG. 4A-4F), it is possible to find and discard corresponding elements of one of the queues 1004'-1006' using the relationship between the elements of the queues 1004-1006, 1004'-1006'. After elements have been removed from one of the sorted MRP queues 1004'1006', the queue may either be resorted or new elements may be inserted in empty locations throughout the sorted queue.

Figure 11:
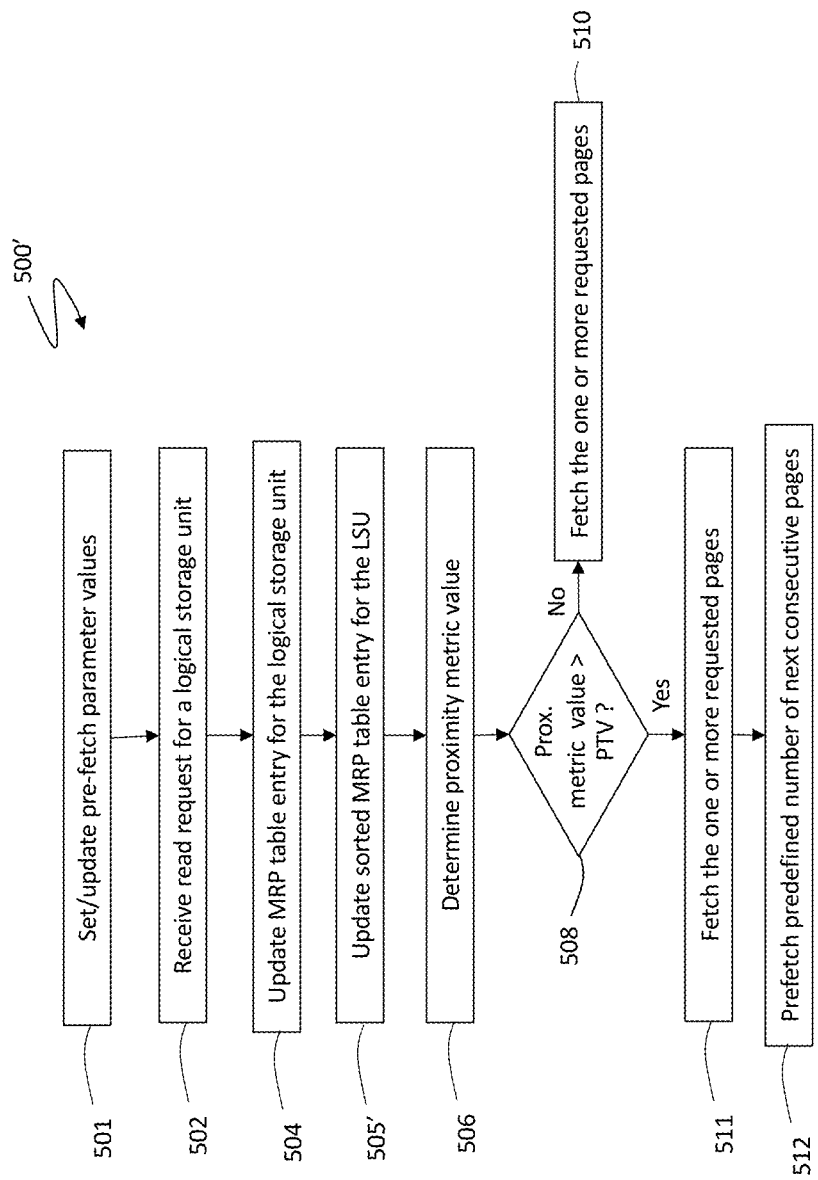
FIG. 11 is a flowchart illustrating determining whether to pre-fetch data for a logical storage unit based on a collective sequential proximity of most recent read requests for the logical storage unit and using persistent sorted queues, according to embodiments of the system described herein.

Referring to FIG. 11, a flowchart 500' illustrates an alternative version of the flowchart 500 of FIG. 5, discussed above. The flowchart 500' is similar to the flowchart 500 and contains many of the same steps, such as the steps 501, 502, etc. However, the flowchart 500' includes a step 505', which is not provided in the flowchart 500. The step 505' replaces the step 505 in the flowchart 500. The step 505' corresponds to the mechanism illustrated in connection with FIG. 10, above, where a page request 1008 is inserted into the sorted MRP queue 1004' in a position that maintains the sort sequence. Note that, generally, the amount of additional processing time to insert the page request 1008 into the sorted MRP queue 1004' is on the order of the length of the sorted MRP queue 1004'. However, having to sort the entire MRP queue 1004 for each iteration is on the order of the length of the MRP queue 1004 multiplied by the log of the length of the MRP queue 1004, which is larger than the length of the MRP queue 1004.

In some instances, it may be desirable to allow the MRP queues to have different sizes (different number of elements) based on an estimate of how long corresponding pages are actually maintained in the cache. That is, for a particular LSU, it is desirable to have the elements in the MRP queue for the LSU correspond to the pages in the cache and have the pages in the cache correspond to the elements in the MRP queue. If the LSU has a relatively large number of pages in the cache, then the size of the MRP queue should be expanded to accommodate additional entries. Conversely, if the LSU has a relatively small number of pages in the cache, then the size of the MRP queue should be reduced to correspond to the cache state of the LSU. As described in more detail below, this functionality may be performed by estimating a lifetime of elements in the MRP queue for the LSU, comparing the estimate with the actual cache state of corresponding pages, and adjusting the size of the MRP queue to increase or decrease the lifetime of elements in the MRP queue based on the comparison. In an embodiment herein, a current timestamp value is provided to each element as the element is added to the MRP queue (e.g., at the step 504, described above in connection with FIG. 5). The timestamp value is used in connection with determining the duration of pages in the cache, as described in more detail elsewhere herein.

Figure 12:
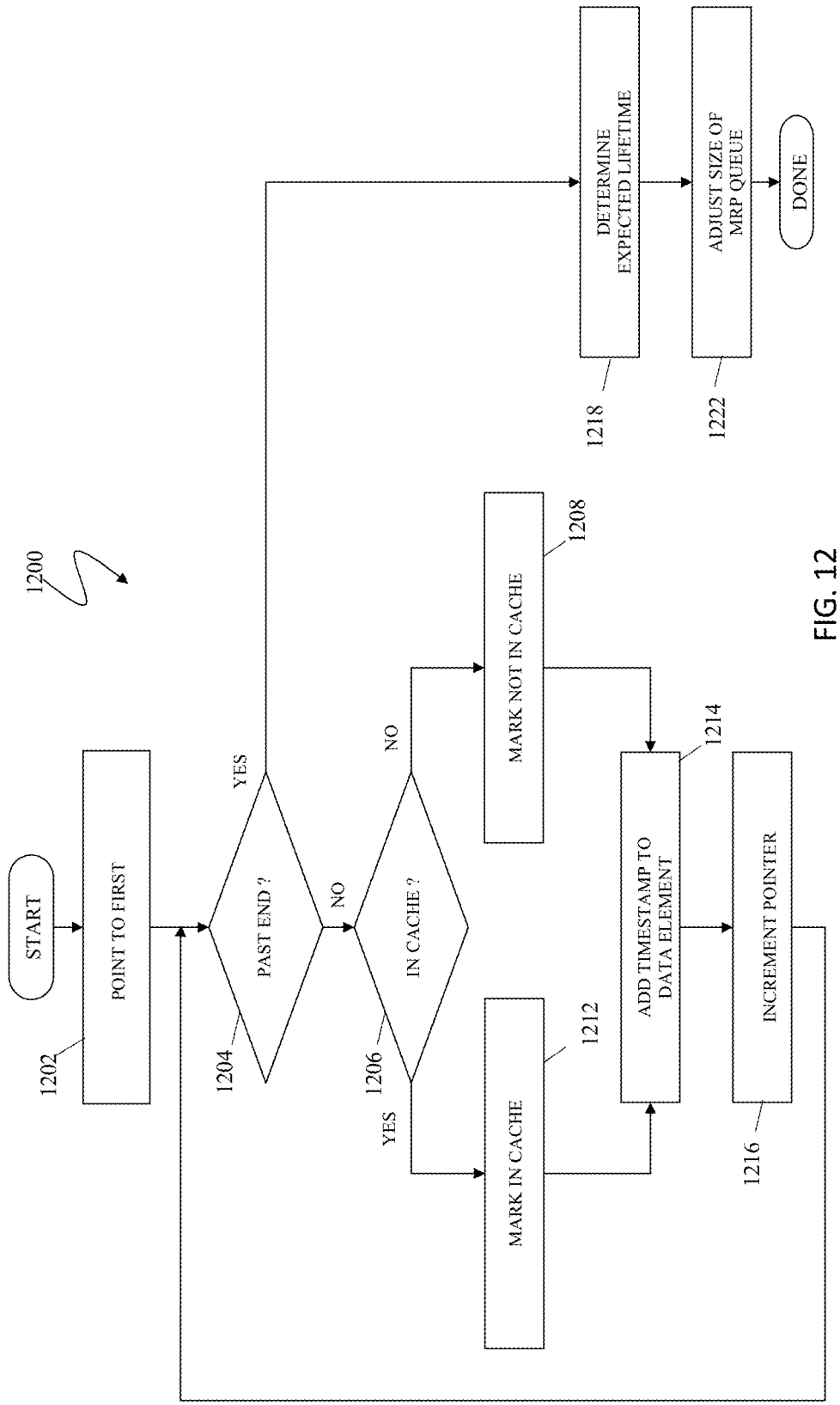
FIG. 12 is a flowchart illustrating adjusting a size of a most recent pages (MRP) queue according to embodiments of the system described herein.

Referring to FIG. 12, a flowchart 1200 illustrates processing performed in connection with examining and possibly adjusting the size of an MRP queue. The processing illustrated by the flowchart 1200 may be performed each time elements are removed from the MRP queue in response to detecting that the MRP queue is full, which is illustrated herein, for example, in FIG. 4C and described in the corresponding text. Thus, following removing the z elements (discussed above), the processing illustrated by the flowchart 1200 is performed to possibly adjust the size of the MRP queue. As described in more detail below, each of the elements that is removed is examined to determine a corresponding cache page is still in the cache.

Processing begins at a first step 1202 where an iteration pointer that iterates through all of the elements being removed from the MRP queue is initialized to point to a first element. Following the step 1202 is a test step 1204 where it is determined if the pointer points past the end of the list (i.e., all elements that are being removed from the MRP queue have been examined). If not, then control transfers from the test step 1204 to a test step 1206 where it is determined if the element being examined (indicated by the pointer) corresponds to a page that has already been removed from the cache. If not, then control transfers from the test step 1206 to a step 1208 where a data element (e.g., a table) is marked to indicate that the cache page corresponding to the element being examined is not in the cache. Otherwise, if it is determined at the step 1206 that the element being examined corresponds to a page that has not been removed from the cache, then control transfers from the test step 1206 to a step 1212 where the data element is marked to indicate that the cache page corresponding to the element being examined is still in the cache. The purpose of indicating whether cache pages corresponding to elements being removed from the MRP queue is described in more detail elsewhere herein.

Following the step 1208 or the step 1212 is a step 1214 where a duration from the element (discussed above) is added to the data element (table) that stores the in cache indication of each element. The duration indicates the difference between the timestamp that indicates when the corresponding page was first added to the cache and the current timestamp that indicates the start of the process of removing elements from the MRP queue. Following the step 1214 is a step 1216 where the pointer that iterates through the elements being removed from the MRP queue is incremented. Following the step 1216, control transfers back to the step 1204, discussed above, for another iteration.

If it is determined at the step 1204 that the pointer used to iterate over the elements being removed from the MRP queue points past the end of the list (i.e., all elements have been processed), then control transfers from the step 1204 to a step 1218 where an expected lifetime of pages in the cache is determined. In an embodiment herein, the expected lifetime of pages in the cache is determined by first determining a duration value for all of the pages using the timestamp of the elements (which indicates when a current page was admitted to the cache) and the current time. The expected lifetime is a value of the duration that minimizes a number of pages that are still in the cache and have a duration that is greater than the actual lifetime and minimizes a number of pages that have been removed from the cache and have a duration that is less than the actual lifetime. This may be determined using any one of a variety of mechanisms, including iteratively testing different duration values to find the value that minimizes the number of pages that are still in the cache with a duration that is greater than the actual lifetime and the number of pages that have been removed from the cache with a duration that is less than the actual lifetime.

Following the step 1218 is a step 1222 where the size of the MRP queue is possibly adjusted based on values of the current expected lifetime and a previously determined expected lifetime value (i.e., an expected lifetime value from the previous iteration). If the current expected lifetime value is greater than the previously determined expected lifetime value, the size of the MRP queue is increased. Conversely, if the current expected lifetime value is less than the previously determined expected lifetime value, the size of the MRP queue is decreased. The size of the MRP queue is not changed if the current expected lifetime value is equal to the previously determined expected lifetime value. The amount of adjustment of the size may be based on the difference between the current expected lifetime and the previous expected lifetime so that, for example, if the current expected lifetime is a 5% greater than a previous expected lifetime, then the size of the MRP queue is increased by 5%. Following the step 1222, processing is complete. In some embodiments, the amount of change is restricted to prevent the MRP queues from becoming too large or too small (including having a size of zero). Thus, each MRP queue may be provided with an initial size and then allowed to expand or contract up to a specific amount, such as 10% of the initial size.

Figure 13:
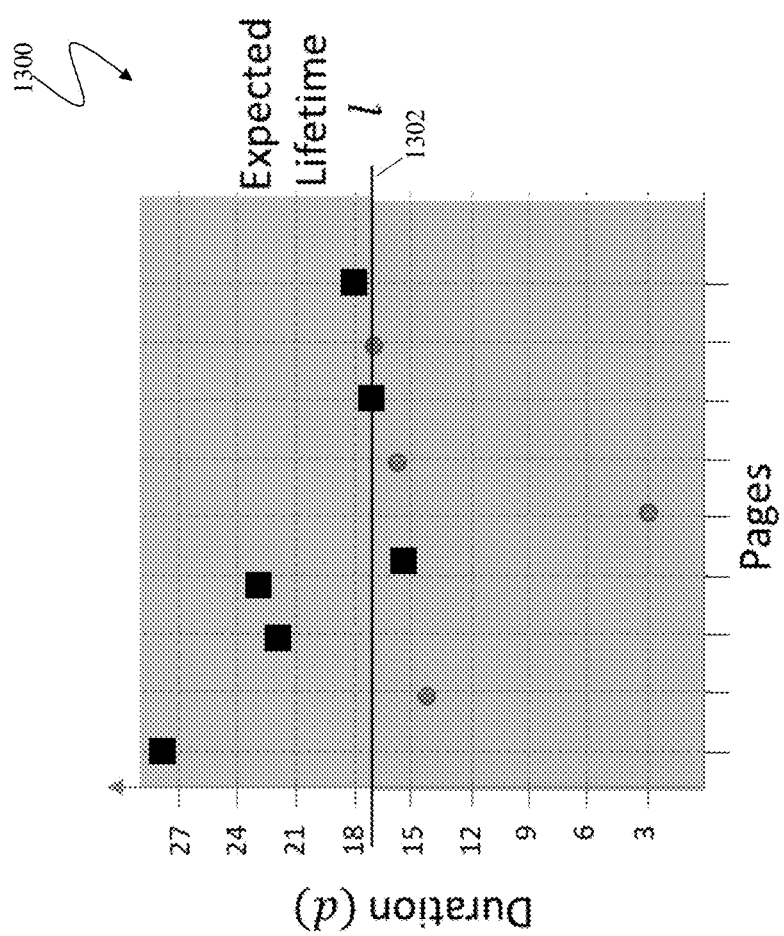
FIG. 13 is a schematic diagram illustrating determining an expected lifetime of pages in a cache memory that correspond to elements of a most recent pages (MRP)queue according to embodiments of the system described herein.

Referring to FIG. 13, a schematic diagram 1300 illustrates determining an expected lifetime value. The diagram 1300 shows a plurality of vertical lines, each of which represents a different one of the elements of the MRP queue that is being removed (and thus being examined in connection with processing illustrated by the flowchart 1200). The vertical axis represents a duration value. A circle or a square on each line indicates an amount of time that the corresponding page remained in the cache where a square indicates that the page is no longer in the cache and a circle indicates that the page is still in the cache. As can be seen from the diagram 1300, pages with a longer duration tend to be already removed from the cache.

An expected lifetime value 1302 is set to minimize a number of pages still in the cache having a greater duration than the expected lifetime 1302 (circles above the expected lifetime 1302) while, at the same time, minimizing a number of pages that are no longer in the cache having a duration that is less than the expected lifetime 1302 (squares below the expected lifetime 1302). The expected lifetime 1302 may be determined by iteratively testing different values for the expected lifetime 1302 to see which values provide the desired minimums. It may also be possible to apply known mathematical algorithms to determine the expected lifetime value 1302.

In some embodiments of the invention, the values of parameters: MRP size, LATV, DNV and PTV may be selected and modified to adjust pre-fetch behavior. The MRP size may be selected to relate directly to the expected lifetime of pages in the cache of the storage system. By tuning the value of MRP size, it is possible to adjust the memory of the techniques of determining whether to pre-fetch on a per-LSU basis according to embodiments described herein to appropriately match the lifetime of pages in the cache.

The DNV may be selected in consideration of a ratio of the MRP size to the DNV. The ratio may control how many of the most recently requested pages of each LSU are considered when an MRP queue overflows (i.e., the MRP queue is full when a next read request specifying one or more pages, or addresses mapping to one or more pages, of the LSU is received). The ratio may be considered to relate to an inertia of the techniques described herein of determining whether to pre-fetch on a per-LSU basis. For a fixed MRP size, smaller values of the DNV may make the techniques described herein more resistant to change; that is, it may take many more sequential requests for an LSU using mechanisms described herein to determine that the LSU is now in a sequential pattern, and for the determination to be made (as a result of the step 508) that pre-fetching is to be performed. Conversely, larger values of DNV (e.g., DNV=MRP size) may reduce the inertia such that every time the MRP queue overflows, it is wiped clean; i.e., the recent page request memory of the LSU is wiped clean, which may result in the pre-fetching behavior of the LSU fluctuating rapidly.

Decreasing the PTV may increase a number of MRP sequences (e.g., of an MRP queue) considered sequentially proximate enough (i.e., having a high enough proximity metric value) to result in pre-fetching being performed for the LSU.

A possible restriction for caching policies of a storage system is the throughput limitation—that is, the system must ensure that at most n I/O operations are performed in a certain timeframe. As a simplistic example, assume that the system must ensure that at most 100 pages can be accessed in a second. It follows that if the cache policy triggers pre-fetching either too frequently or too aggressively (e.g., with large LAVs), this throughput will limit the actual number of requests processed. Such a loss of efficiency may be unacceptable, for example, in production environments. Hence, cache policies may benefit from a way of parametrically limiting the number of pre-fetched pages. Using techniques described herein, the number of pre-fetched pages can be parametrically limited by adjusting the LATV (and the LAV) such that less pages are pre-fetched when a prefetch operation is performed, or by limiting the number of pre-fetch operations performed, for example, by increasing the PTV.

In known pre-fetching techniques, it is determined whether to perform a pre-fetch for an LSU by determining whether, for a current page, p, of the LSU, a predetermined number, n, of the immediately preceding pages (p-1 . . . p-n) of the LSU are still in a cache of the system. If all of the predetermined number of pages are in the cache, then a pre-fetch is performed. To reduce a number of prefetch operation performed, the predetermined number, n, may be increased. However, increasing this number even slightly may cause a massive drop in the number of pre-fetch operation performed, primarily because the older pages are less likely to still be in cache due to eviction policies of the cache.

In contrast to such known pre-fetching techniques, increasing or decreasing of the PTV may allow for a fine-tuning of the number of pre-fetches. By slightly increasing the PTV, a few less pre-fetches may be made, and by decreasing the PTV slightly, a few more pre-fetches may be made.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein may be implemented using one or more of the systems and/or data structures described in relation to FIG. 1 and FIG. 2, or components thereof. Furthermore, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

An element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of managing a cache memory in a storage system, comprising:
    maintaining a first queue that stores data indictive of the read requests for pages of a particular logical storage unit of the storage system in an order that the read requests are received by the storage system;
    maintaining a second queue that stores data indictive of the read requests for the pages of the particular logical storage unit in a sort order corresponding to page numbers of the read requests, the second queue persisting for a plurality of iterations of read requests, wherein the page numbers correspond to a position of the pages within an ordered sequence of pages of the logical storage unit;
    receiving a read request for a particular one of the pages of the particular logical storage unit;
    placing data indicative of the read request in the first queue;
    placing the data indicative of the read request in the second queue while maintaining the sort order of the second queue;
    determining a plurality of difference values according to a difference of page numbers between each pair of adjacent elements in the second queue;
    determining a prefetch metric value that varies according to a count of a number of times each of the difference values is less than a predetermined value and greater than zero; and
    prefetching a plurality of pages having page numbers that come after the particular one of the pages sequentially in response to the prefetch metric value being greater than a predefined value.

2. A method, according to claim 1, wherein the first queue and the second queue have a fixed size.

3. A method, according to claim 1, wherein the pre-defined value is based on a look-ahead window.

4. A method, according to claim 1, wherein the pre-fetch metric value is determined by dividing the count of the number of times each of the difference values is less than a predetermined value and greater than zero by a number of the difference values that are greater than zero.

5. A method, according to claim 1, wherein a number of elements are discarded from the first queue and the second queue in response to the read request occurring when the queues are full.

6. A method, according to claim 5, wherein the number of elements that are discarded is 50% of the elements.

7. A method, according to claim 1, wherein there is a relationship between elements of the first queue and elements of the second queue that facilitates accessing corresponding elements of the second queue by initially accessing elements of the first queue.

8. A non-transitory computer readable medium containing software that manages a cache memory in a storage system that also contains a first queue that stores data indictive of the read requests for pages of a particular logical storage unit of the storage system in an order that the read requests are received by the storage system and a second queue that stores data indictive of the read requests for the pages of the particular logical storage unit in a sort order corresponding to page numbers of the read requests, the second queue persisting for a plurality of iterations of read requests and the page numbers correspond to a position of the pages within an ordered sequence of pages of the logical storage unit, the software comprising:
    executable code that receives a read request for a particular one of the pages of the particular logical storage unit;
    executable code that places data indicative of the read request in the first queue;
    executable code that places the data indicative of the read request in the second queue while maintaining the sort order of the second queue;
    executable code that determines a plurality of difference values according to a difference of page numbers between each pair of adjacent elements in the second queue;
    executable code that determines a prefetch metric value that varies according to a count of a number of times each of the difference values is less than a predetermined value and greater than zero; and
    executable code that prefetches a plurality of pages having page numbers that come after the particular one of the pages sequentially in response to the prefetch metric value being greater than a predefined value.

9. A non-transitory computer readable medium, according to claim 8, wherein the first queue and the second queue have a fixed size.

10. A non-transitory computer readable medium, according to claim 8, wherein the pre-defined value is based on a look-ahead window.

11. A non-transitory computer readable medium, according to claim 8, wherein the pre-fetch metric value is determined by dividing the count of the number of times each of the difference values is less than a predetermined value and greater than zero by a number of the difference values that are greater than zero.

12. A non-transitory computer readable medium, according to claim 8, wherein a number of elements are discarded from the first queue and the second queue in response to the read request occurring when the queues are full.

13. A non-transitory computer readable medium, according to claim 12, wherein the number of elements that are discarded is 50% of the elements.

14. A non-transitory computer readable medium, according to claim 8, wherein there is a relationship between elements of the first queue and elements of the second queue that facilitates accessing corresponding elements of the second queue by initially accessing elements of the first queue.

15. A storage system, comprising:
    a plurality of storage units that store data written to the storage system;
    a first subset of directors coupled to the storage units;
    a second subset of directors that provide data access to the storage system, including data access to write data to the storage system and data access to read data that was previously written to the storage system;
    a memory coupled to at least some of the directors, the memory providing a cache memory, and providing a first queue that stores data indictive of read requests for pages of a particular logical storage unit of the storage system in an order that the read requests are received by the storage system and a second queue that stores data indictive of the read requests for the pages of the particular logical storage unit in a sort order corresponding to page numbers of the read requests, the second queue persisting for a plurality of iterations of read requests and the page numbers correspond to a position of the pages within an ordered sequence of pages of the logical storage unit; and a non-transitory computer readable medium containing software that manages the cache memory, the software having executable code that receives a read request for a particular one of the pages of the particular logical storage unit, executable code that places data indicative of the read request in the first queue, executable code that places the data indicative of the read request in the second queue while maintaining the sort order of the second queue, executable code that determines a plurality of difference values according to a difference of page numbers between each pair of adjacent elements in the second queue, executable code that determines a prefetch metric value that varies according to a count of a number of times each of the difference values is less than a predetermined value and greater than zero, and executable code that prefetches a plurality of pages having page numbers that come after the particular one of the pages sequentially in response to the prefetch metric value being greater than a predefined value.

16. A storage system, according to claim 15, wherein the first queue and the second queue have a fixed size.

17. A storage system, according to claim 15, wherein the pre-defined value is based on a look-ahead window.

18. A storage system, according to claim 15, wherein the pre-fetch metric value is determined by dividing the count of the number of times each of the difference values is less than a predetermined value and greater than zero by a number of the difference values that are greater than zero.

19. A storage system, according to claim 15, wherein a number of elements are discarded from the first queue and the second queue in response to the read request occurring when the queues are full.

20. A storage system, according to claim 15, wherein there is a relationship between elements of the first queue and elements of the second queue that facilitates accessing corresponding elements of the second queue by initially accessing elements of the first queue.

* * * * *